(12) United States Patent
Ayyalasomayajula et al.

(10) Patent No.: US 12,282,111 B2
(45) Date of Patent: Apr. 22, 2025

(54) WIRELESS DEVICE LOCALIZATION

(71) Applicant: The Regents of the University of California, Oakland, CA (US)

(72) Inventors: Sai Roshan Ayyalasomayajula, San Diego, CA (US); Dinesh Bharadia, San Diego, CA (US); Shreya Ganesaraman, San Diego, CA (US); Ish Jain, San Diego, CA (US); Shrivatsan Rajagopalan, San Diego, CA (US); Aravind Seetharaman, San Diego, CA (US); Sanatan Sharma, San Diego, CA (US); Aditya Arun, San Diego, CA (US); Chenfeng Wu, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 431 days.

(21) Appl. No.: 17/604,380

(22) PCT Filed: May 1, 2020

(86) PCT No.: PCT/US2020/031152
§ 371 (c)(1),
(2) Date: Oct. 15, 2021

(87) PCT Pub. No.: WO2020/223689
PCT Pub. Date: Nov. 5, 2020

(65) Prior Publication Data
US 2022/0196787 A1 Jun. 23, 2022

Related U.S. Application Data

(60) Provisional application No. 62/841,643, filed on May 1, 2019.

(51) Int. Cl.
*G01S 5/02* (2010.01)
*G01S 5/08* (2006.01)
(Continued)

(52) U.S. Cl.
CPC ............. *G01S 5/08* (2013.01); *H04W 64/003* (2013.01); *H04W 84/12* (2013.01); *H04W 88/08* (2013.01)

(58) Field of Classification Search
CPC ....... G01S 5/08; H04W 64/003; H04W 84/12; H04W 88/08
See application file for complete search history.

(56) References Cited

U.S. PATENT DOCUMENTS

| 2010/0225541 A1 | 9/2010 | Hertzog et al. | |
| 2013/0003572 A1* | 1/2013 | Kim | H04W 64/00 370/252 |

(Continued)

OTHER PUBLICATIONS

IP.com search history (Year: 2024).*
(Continued)

*Primary Examiner* — Moustapha Diaby
(74) *Attorney, Agent, or Firm* — Mintz Levin Cohn Ferris Glovsky and Popeo, P.C.

(57) ABSTRACT

A method, a system, and a computer program product for localization of wireless devices. At least one of mapping and wireless data describing a physical environment is received. The physical environment includes one or more wireless access points. Using the received mapping and/or wireless data, a location of each of the wireless access points is determined. Using the determined location of the wireless access points, one or more wireless devices positioned in the physical environment are located.

28 Claims, 19 Drawing Sheets

(51) Int. Cl.
*H04W 4/02* (2018.01)
*H04W 64/00* (2009.01)
*H04W 84/12* (2009.01)
*H04W 88/08* (2009.01)

(56) References Cited

U.S. PATENT DOCUMENTS

| | | | | |
|---|---|---|---|---|
| 2013/0165144 A1* | 6/2013 | Ziskind | | H04W 4/02 |
| | | | | 455/456.1 |
| 2015/0304984 A1* | 10/2015 | Khemani | | H04W 16/18 |
| | | | | 455/456.1 |
| 2016/0192151 A1* | 6/2016 | Marri Sridhar | | H04W 4/20 |
| | | | | 455/418 |
| 2016/0255603 A1* | 9/2016 | Venkatraman | | H04W 64/00 |
| | | | | 455/456.1 |
| 2017/0115123 A1* | 4/2017 | Kang | | H04W 4/023 |
| 2017/0134910 A1 | 5/2017 | Gu et al. | | |
| 2018/0007652 A1* | 1/2018 | Sharma | | H04W 4/029 |
| 2020/0045665 A1* | 2/2020 | Kuang | | H04W 4/33 |

OTHER PUBLICATIONS

ProQuest search History (Year: 2024).*
Adib, F. et al., "3D Tracking via Body Radio Reflections," In NSDI, vol. 14. 317-329, 2014.
Adib, F. et al., "Multi-Person Localization via RF Body Reflections," In NSDL 279-292, 2015.
Adib, F. et al., "See through walls with WiFi!" vol. 43. ACM, 2013.
Alsindi, N. A. et al., "Measurement and modeling of ultrawideband toa-based ranging in indoor multipath environments," IEEE Transactions on Vehicular Technology, 58(3):1046-1058, 2009.
Ayyalasomayajula, R. et al., "BLoc: CSI-based accurate localization for BLE tags," In Proceedings of the 14th International Conference on emerging Networking Experiments and Technologies. ACM, 126-138, 2018.
Bahl, V. et al., "RADAR: An In-Building RF-based User Location and TrackingSystem," INFOCOM, 2000.
Bosch. Laser Measure DLE40 professional (available at https://usermanual.wiki/m/b84c6235e4f9225bdfec3dd23f40b6b923814f22528a4f22fe99c88ad650a5da.pdf) 4 pages.
Buades, A. et al., "A non-local algorithm for image denoising," In Computer Vision and Pattern Recognition, 2005. CVPR 2005. IEEE Computer Society Conference on, vol. 2. IEEE, 60-65.
Cao, M. et al., "Sensor network localization with imprecise distances," Systems & control letters, 55(11):887-893, 2006.
Chan, Y.-T. et al., "Time-of-arrival based localization under nlos conditions,". IEEE Transactions on Vehicular Technology, 55(1):17-24, 2006.
Chen, H. et al., "Non-line-of-sight node localization based on semi-definite programming in wireless sensor networks," IEEE Transactions on Wireless Communications, 11(1):108-116, 2012.
Chintalapudi, K et al., "Indoor Localization Without the Pain," MobiCom, 2010.
Chuo, L.-X. et al., "RF-Echo: A Non-Line-of-Sight Indoor Localization System Using a Low-Power Active RF Reflector ASIC Tag," In Proceedings of the 23rd Annual International Conference on Mobile Computing and Networking. ACM, 222-234, 2017.
Cong, L. et al., "Nonline-of-sight error mitigation in mobile location," IEEE Transactions on Wireless Communications, 4(2):560-573, 2005.
Diao, Y. et al., "A barycentric coordinate based distributed localization algorithm for sensor networks," IEEE Transactions on Signal Processing, 62(18):4760-4771, 2014.
Di Franco, C. et al., "Calibration-free network localization using nonline-of-sight ultra-wideband measurements," In Proceedings of the 16th ACM/IEEE International Conference on Information Processing in Sensor Networks, pp. 235-246. ACM, 2017.

Dong, C. et al., "Image super-resolution using deep convolutional networks," PEP transactions on pattern analysis and machine intelligence 38, 2 (2016), 295-307, 2016.
Gjengset, J. et al., "Phaser: Enabling Phased Array Signal Processing on Commodity Wi-Fi Access Points," MobiCom, 2014.
Goodfellow, I. et al., "Generative adversarial nets," In Advances in neural information processing systems. 2672-2680, 2014.
Goswami, A. et al., "WiGEM: A learning-based approach for indoor localization," In Proceedings of the Seventh Conference on emerging Networking Experiments and Technologies, p. 3. ACM, 2011.
Grisetti, G. et al., "Improved techniques for grid mapping with raoblackwellized particle filters," IEEE transactions on Robotics, 23(1):34-46, 2007.
Grisetti, G. et al., "Improving grid-based slam with raoblackwellized particle filters by adaptive proposals and selective resampling," In Proceedings of the 2005 IEEE international conference on robotics and automation. IEEE, 2432-2437, 2005.
Han, D. et al., "Access point localization using local signal strength gradient," In International Conference on Passive and active network measurement, pp. 99-100. Springer, 2009.
Hashemifar, Z. S. et al., "Improving RGB-D SLAM using Wi-Fi," In Proceedings of the 16th ACM/IEEE International Conference on Information Processing in Sensor Networks. ACM, 317-318, 2017.
Hess, W. et al., "Real-Time Loop Closure in 2D LIDAR SLAM," In 2016 IEEE International Conference on Robotics and Automation (ICRA). 1271-1278, 2016.
Huang, J. et al., "Efficient, generalized indoor Wi-Fi graphslam," In Robotics and Automation (ICRA), 2011 IEEE International Conference on. IEEE, 1038-1043, 2011.
Infsoft. [n. d.]. Bluetooth Low Energy Beacons (available at https://www.infsoft.com/basics/positioning-technologies/bluetooth-low-energy-beacons/) 8 pages.
Isola, P. et al., "Image-to-Image Translation with Conditional Adversarial Networks," arXiv:1611.07004v1 (2016).
Iyer, V. et al., "Inter-technology backscatter: Towards internet connectivity for implanted devices," In SIGCOMM, 2016.
Johnson, J. et al., "Perceptual losses for real-time style transfer and super-resolution," In European Conference on Computer Vision. Springer, 694-711, 2016.
Joshi, K. et al., "PinPoint: Localizing Interfering Radios," NSDI, 2013.
Kelkar, S. et al., "SqueezeGAN: Image to Image Translation With Minimum Parameters," In 2018 International Joint Conference on Neural Networks (IJCNN). IEEE, 1-6.
Kellogg, B. et al., "Passive Wi-Fi: Bringing Low Power to Wi-Fi Transmissions," In NSDI, 2016.
Kellogg, B. et al., "Wi-Fi backscatter: Internet connectivity for RF-powered devices," In ACM SIGCOMM Computer Communication Review, 2014.
Kempke, B. et al., "Harmonium: Asymmetric, bandstitched uwb for fast, accurate, and robust indoor localization," In 2016 15th ACM/IEEE International Conference on Information Processing in Sensor Networks (IPSN), pp. 1-12. IEEE, 2016.
Khan, U. A. et al., "DILAND: An algorithm for distributed sensor localization with noisy distance measurements," IEEE Transactions on Signal Processing, 58(3):1940-1947, 2010.
Khan, U. A. et al., "Distributed sensor localization in random environments using minimal number of anchor nodes," IEEE Transactions on Signal Processing, 57(5):2000-2016, 2009.
Kias, U., ""Open Street Map" as a Problem Based Learning Project: Opportunities to Use and Contribute to the Free Map of the World," Journal of Digital Landscape Architecture, 4(2019), pp. 338-343.
Kim, J. et al., "Accurate image super-resolution using very deep convolutional networks," In Proceedings of the IEEE conference on computer vision and pattern recognition. 1646-1654, 2016.
Kingma, D. P. et al., "Adam: A method for stochastic optimization." arXiv preprint arXiv:1412.6980, 2014.
Kotaru, M. et al., "Position tracking for virtual reality using commodity Wi-Fi," In Proceedings of the IEEE Conference on Computer Vision and Pattern Recognition, pp. 68-78, 2017.
Kotaru, M. et al., "Spotfi: Decimeter level localization using Wi-Fi," In ACM SIGCOMM Computer Communication Review Aug. 17, 2015 (vol. 45, No. 4, pp. 269-282). ACM.

(56) References Cited

OTHER PUBLICATIONS

Kumar, S. et al., "Accurate Indoor Localization with Zero Start-up Cost," MobiCom, 2014.

Ladd, A. M. et al., "Robotics-based location sensing using wireless ethernet," Wireless Networks, 11(1-2):189-204, 2005.

Laffont, P.-Y. et al., "Transient attributes for high-level understanding and editing of outdoor scenes," ACM Transactions on Graphics (TOG) 33, 4(2014), 149.

Liu, H. et al., "Survey of wireless indoor positioning techniques and systems, " IEEE Transactions on Systems, Man, and Cybernetics, Part C (Applications and Reviews), 37(6):1067-1080, 2007.

Locatify. Indoor Position System using BLE beacons. (available at https://locatify.com/blog/indoor-positioning-systems-ble-beacons/) 11 pages.

Ma, Y. et al., "Drone relays for battery-free networks," In Proceedings of the Conference of the ACM Special Interest Group on Data Communication. ACM, 335-347, 2017.

Ma, Y. et al., "Minding the billions: Ultra-wideband localization for deployed RFID tags," In MobiCom, 2017.

Mariakakis, A. T. et al., "Sail: Single access point-based indoor localization," In Proceedings of the 12th annual international conference on Mobile systems, applications, and services, pp. 315-328. ACM, 2014.

Martin, Paul, et al. "An ibeacon primer for indoor localization: demo abstract." Proceedings of the 1st ACM Conference on Embedded Systems for Energy-Efficient Buildings. ACM, 2014.

Nandakumar, R. et al., "3D Localization for Sub-Centimeter Sized Devices," In Proceedings of the 16th ACM Conference on Embedded Networked Sensor Systems. ACM, 108-119, 2018.

Nowicki, M. et al., "Low-effort place recognition with Wi-Fi fingerprints using deep learning," In International Conference Automation. Springer, 575-584, 2017.

Priyantha, N. B. et al., "The cricket location-support system," In Proceedings of the 6th annual international conference on Mobile computing and networking, pp. 32-43. ACM, 2000.

Prorok, A. et al., "Accurate indoor localization with ultra-wideband using spatial models and collaboration," The International Journal of Robotics Research, 33(4):547-568, 2014.

Pu, Q. et al., "Whole-home Gesture Recognition Using Wireless Signals (MobiCom)," 2013.

Quantenna. Quantenna 802.11ac WiFi Card, 1 page.

Rahul, H. et al., "JMB: scaling wireless capacity with user demands," Proceedings of the ACM SIGCOMM 2012 conference on Applications, technologies, architectures, and protocols for computer communication. ACM, 2012.

Rizos, C. et al., "Experimental results of Locata: A high accuracy indoor positioning system," In Indoor Positioning and Indoor Navigation (IPIN). 2010 International Conference on, pp. 1-7. IEEE, 2010.

ROS. Robot Operating System (available at ros.org) 4 pages.

Sahinoglu, Z. "Ultra-wideband positioning systems" Cambridge University Press, 2008.

Sanborn. [n. d.]. SPIN Indoor Mapping. ([n. d.]). (available at https://www.sanborn.com/spin-indoor-mapping/) 2 pages.

Sen, S. et al., "You are facing the Mona Lisa: Spot localization using phy layer information," In Proceedings of the 10th international conference on Mobile systems, applications, and services, pp. 183-196. ACM, 2012.

Shih, Y. et al., "Data-driven hallucination of different times of day from a single outdoor photo," ACM Transactions on Graphics (TOG) 32, 6 (2013), 200.

Soltanaghaei, E. et al., "Multipath Triangulation: Decimeter-level WiFi Localization and Orientation with a Single Unaided Receiver," In MobiSyS, 2018.

Subramanian, A. P. et al., "Drive-by localization of roadside Wi-Fi networks," In IEEE Infocom 2008—The 27th Conference on Computer Communications, pp. 718-725. IEEE, 2008.

Trevor, A. J. B. et al., "OmniMapper: A modular multimodal mapping framework," In 2014 IEEE International Conference on Robotics and Automation (ICRA). 1983-1990.

Turtlebot. [n. d.]. Turtlebot Robotics (available at turtlebot.com) 2 pages.

Vanderveen, M. C. et al., "Joint angle and delay estimation (JADE) for multipath signals arriving at an antenna array," IEEE Communications letters, 1(1):12-14, 1997.

Vasisht, D. et al, "Decimeter-Level Localization with a Single Wi-Fi Access Point," In NSDI Mar. 16, 2016 (vol. 16, pp. 165-178).

Vicon. T-Series. (available at www.vicon.com/products/documents/Tseries.pdf) 2 pages.

Wang, J. et al. "Dude, Where's My Card?: RFID Positioning That Works with Multipath and Non-line of Sight," SIGCOMM, 2013.

Wang, J. et al., "LiFS: low human-effort, device-free localization with fine-grained subcarrier information," In Proceedings of the 22nd Annual International Conference on Mobile Computing and Networking. ACM, 243-256, 2016.

Wang, J. et al., "RF-compass: Robot object manipulation using RFIDs," In Proceedings of the 19th annual international conference on Mobile computing & networking. ACM, 3-14, 2013.

Wang, J. et al., RF-idraw: Virtual touch screen in the air using RF signals, ACM SIGCOMM, 2014.

Xie, Y. et al., "mD-Track: Leveraging Multi-Dimensionality in Passive Indoor Wi-Fi Tracking," arXiv preprint arXiv:1812.03103, 2018.

Xie, Y. et al., "xD-track: leveraging multi-dimensional information for passive Wi-Fi tracking," In Proceedings of the 3rd Workshop on Hot Topics in Wireless. ACM, 39-43, 2016.

Xiong, J. et al., "ArrayTrack: A Fine-grained Indoor Location System," NSDI, 2013.

Xiong, J. "Synchronicity: Pushing the envelope of fine-grained localization with distributed MIMO," In HotWireless, 2014.

Xiong, J. et al., "Tone-Track: Leveraging Frequency-Agile Radios for Time-Based Indoor Wireless Localization," Mobi-Com , 2015.

Xiong, J. et al., "Towards fine-grained radio-based indoor location," In Proceedings of the Twelfth Workshop on Mobile Computing Systems & Applications. ACM, 13, 2012.

Xu, C. et al., "Improving RF-based Device-free Passive Localization in Cluttered Indoor Environments Through Probabilistic Classification Methods," IPSN, 2012.

Yang, L. et al., "Tagoram: Real-time tracking of mobile RFID tags to high precision using cots devices," MobiCom, 2014.

Yenamandra, V. et al., "Vidyut: exploiting power line infrastructure for enterprise wireless networks," ACM SIGCOMM Computer Communication Review. vol. 44. No. 4. ACM, 2014.

Youssef, M. et al., "The Horus WLAN Location Determination System," MobiSys, 2005.

Zaruba, G. V. et al., "Indoor location tracking using RSSI readings from a single Wi-Fi access point," Wireless networks, 13(2):221-235, 2007.

Zhang, K. et al., "Beyond a Gaussian denoiser: Residual learning of deep CNN for image denoising," IEEE Transactions on Image Processing 26, 7 (2017), 3142-3155.

Zhang, P. et al., "Hitchhike: Practical backscatter using commodity wifi," In SenSys, 2016.

Zhang, R. et al., "Colorful image colorization," In European Conference on Computer Vision. Springer, 649-666, 2016.

Zhao, M. et al., "RF-based 3D skeletons," In Proceedings of the 2018 Conference of the ACM Special Interest Group on Data Communication. ACM, 267-281, 2018.

Zhao, M. et al., "Throughwall human pose estimation using radio signals," In Proceedings of the TFPF Conference on Computer Vision and Pattern Recognition. 7356-7365, 2018.

Zhu, J.-Y. et al., "Unpaired image-to-image translation using cycle-consistent adversarial networks," arXiv preprint (2017).

Zhu, X. et al., "RSSI-based algorithm for indoor localization," Communications and Network, 5(02):37, 2013.

Kannan et al., "Predictive indoor navigation using commercial smart-phones," In: Proceedings of the 28th Annual ACM Symposium on Applied Computing. Mar. 2013. https://www.ri.cmu.edu/pub_files/2011/12/percom-navigation-main.pdf.

Hou et al., "Efficient AoA-based wireless indoor localization for hospital outpatients using mobile devices." In: Sensors. Oct. 30, 2018. https://www.ncbinlm.nih.gov/articles/PMC6263839/pdf/sensors-18-03698.pdf.

(56) References Cited

OTHER PUBLICATIONS

Martin, "Collaborative and Efficient Indoor Localization for Mobile Systems." In: Diss. UCLA 2016. https://escholarship.org/content/qt9w29v33v/qt9w29v33v.pdf.

Xiao et al., "A survey on wireless indoor localization from the device perspective." In: ACM Computing Surveys (CSUR). Nov. 2016. https://ink.library.smu.edu.sg/cgi/viewcontent.cgi?article=5886&context=sis_research.

\* cited by examiner

WIRELESS DEVICE LOCALIZATION

CROSS-REFERENCE TO RELATED APPLICATIONS

The present application claims priority to and is a national stage entry of International Application No. PCT/US2020/031152 to Ayyalasomayajula, et al., filed on May 1, 2020, and entitled "Wireless Device Localization," which claims priority to U.S. Provisional Patent Appl. No. 62/841,643 to Ayyalasomayajula, et al., filed May 1, 2019, and entitled "Reverse Localization of Off-the-Shelf WiFi Access Points", and incorporates its-their disclosures herein by reference in its-their entireties.

TECHNICAL FIELD

The current subject matter generally relates to data processing, and in particular, determination of location of wireless devices, tags, such as, WiFi access points and/or any other communication access points.

BACKGROUND

Location services rely on two components: a mapping system and a positioning system. The mapping system provides the physical map of the space, and the positioning system identifies the position within the map. Outdoor location services have thrived over the last couple of decades because of well-established platforms for both these components (e.g., Google Maps for mapping, and GPS for positioning). In contrast, indoor location services have not caught up because of the lack of reliable mapping and positioning frameworks, as GPS is known not to work indoors. Wi-Fi positioning lacks maps and is also prone to environmental errors.

Indoor localization has been studied for nearly two decades fueled by wide interest in indoor navigation, achieving the necessary decimeter-level accuracy. However, there are no real-world deployments of WiFi-based user localization algorithms, primarily because these algorithms are infrastructure dependent and therefore assume the location of the access points, their antenna geometries, and deployment orientations in the physical map. In the real world, such detailed knowledge of the location attributes of the access point is seldom available, thereby making WiFi localization hard to deploy.

SUMMARY

In some implementations, the current subject matter relates to a computer implemented method for localization of wireless devices. The method may include receiving at least one of mapping and wireless data describing a physical environment, the physical environment including one or more wireless access points, determining, using the received at least one of mapping and wireless data, a location of each of the wireless access points, and locating, using the determined location of the wireless access points, one or more wireless devices positioned in the physical environment.

In some implementations, the current subject matter may include one or more of the following optional features. In some implementations, receiving may include autonomously determining mapping and/or wireless data describing the physical environment. Receiving may also include receiving the mapping and/or wireless data from a first device (e.g., a "bot"). The first device may include at least one of the following: a wireless receiver, a wireless transmitter, one or more processors, one or more servers, one or more motion components, one or more sensors, one or more cameras, one or more navigational sensors, one or more graphics processors, and any combination thereof.

In some implementations, the method may also include determining one or more location accuracy requirements for locating each of the wireless access points. The locating of the wireless devices may be executed using the determined location accuracy requirements.

In some implementations, the method may also include triangulating the wireless devices to determine location of the wireless devices. The triangulating may be executed using one or more errors associated with location of each of the wireless access points in the physical environment.

In some implementations, the determination of the location may include receiving wireless channel data associated with the one or more wireless access points.

In some implementations, the wireless access points may include at least one of the following: a wireless access device, a WiFi modem, a cellular base station, a wireless anchor device, a wireless transmitter, a wireless receiver, a cellular telephone, a smartphone, a tablet, a personal computer, and any combination thereof.

The determination may further include determining one or more angles of arrival of a wireless signal at the one or more wireless access points from a plurality of location points in the physical environment, and triangulating, based on the determined one or more angles of arrival, the location of each of the one or more wireless access points. Further, locating each of the wireless access points may include locating one or more of the antennas on each of the wireless access points. At least one wireless access point may be configured to be excluded from executing of the locating of the wireless devices (e.g., based on a confidence metric as described above).

In some implementations, the determination may also include determining a separation distances between one or more antennas of the one or more wireless access points. Further, it may also include determining an orientation of one or more antennas of the one or more wireless access points. In some implementations, the determination may further include simultaneously determining the separation distances and the orientation of the antennas. The simultaneously determination may include determining a relative location of the antennas on each of the wireless access points with respect to the determined wireless access point locations. Further, simultaneous determination may also include measuring a phase difference across an antenna of the access points and one or more antennas of the access points, whose separation distances and orientation were determined.

Moreover, the current subject matter may also estimate a direct path of a signal to the one or more wireless access points based on at least one of a direction of (e.g., an angle of arrival, angle of departure, etc.) of the signal and a time of flight of the signal to the one or more wireless access points. In some implementations, the direction of the signal having the least time of flight measured at a wireless receiver for each of the one or more antennas of the one or more of the wireless access points.

In some implementations, the receiving may include, using a wireless channel data associated with the one or more wireless access points, determining coordinates of the one or more wireless access points in the physical environment.

In some implementations, locating may include, using a neural network, generating a model of the physical environment, wherein one or more wireless signals generated by at least one of: the one or more wireless access points and the one or more wireless devices, and physical coordinates of the one wireless access points, being input to the neural network. The neural network may include an encoder component and one or more decoder components. In some implementations, the wireless signals may be represented as heat map images and configured to be processed by the encoder component. At least one of the decoder components may be configured to generate a corrected heat map image from the heat map images. At least another decoder component may be configured to generate an output location image of the one or more wireless devices.

Implementations of the current subject matter can include, but are not limited to, systems and methods consistent including one or more features are described as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to the rendering of cortical bone using ultrasound, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIGS. 11b-c illustrate exemplary plots for estimating phase difference of the wireless device shown in FIG. 11a;

DETAILED DESCRIPTION

Figure 1:
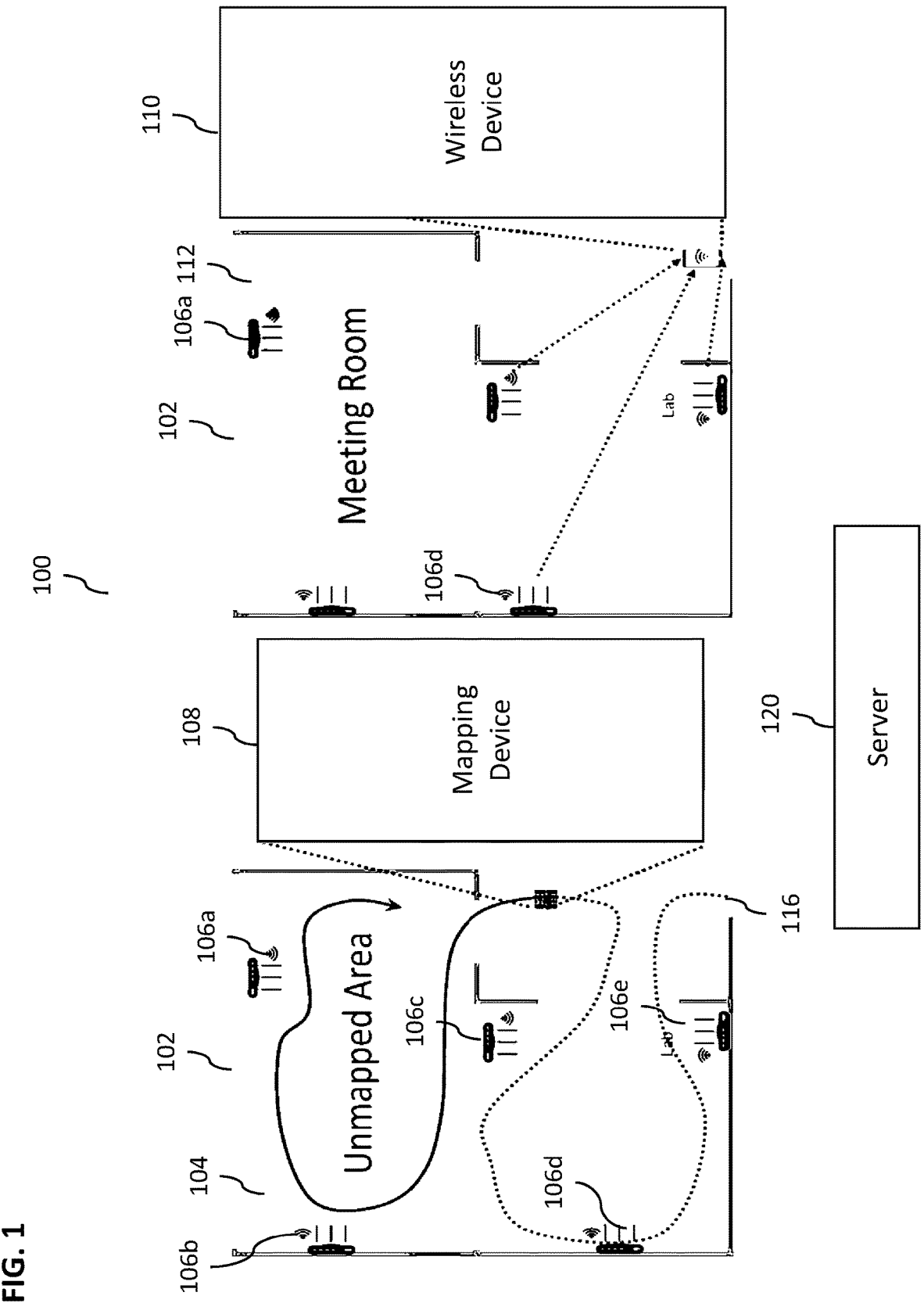
FIG. 1 illustrates an exemplary system for executing an automated mapping process, according to some implementations of the current subject matter.

One or more implementations of the current subject matter relate to methods, systems, articles of manufacture, and the like that may, among other possible advantages, provide determination (e.g., through reverse localization) of a location of a wireless access point (e.g., a WiFi access point, a base station, etc.).

In some implementations, the current subject matter may be configured to provide a system configured to executed a deep learning based wireless access point localization algorithm that may be configured to overcome traditional limitations of radio frequency (RF)-based localization approaches (e.g., multipath, occlusions, etc.). The system may use data from a current subject matter's mapping platform that may be configured to construct location-tagged maps of an environment where access points may be located. As a result, the current subject matter system may allow wireless communications devices (e.g., Wi-Fi devices, smartphones, computers, etc.) to access a map of the environment and to estimate their position with respect to that map.

Moreover, in some implementations, the current subject matter system may be configured to establish accuracy requirements for the location attributes of access points to achieve high level (e.g., decimeter, etc.) user localization accuracy. These requirements for antenna geometries and deployment orientation are very stringent, requiring millimeter level and sub-10 of accuracy respectively, which is hard to achieve with conventional systems. The current subject matter system provides an autonomous system to physically map the environment and accurately locate the attributes of existing wireless infrastructure in the physical space down to the required stringent accuracy of, for example, 3 mm antenna separation and, for example, 3° deployment orientation median errors, as compared to conventional systems' 150 mm and 25°, respectively.

Introduction of GPS and GPS-referenced public maps (e.g., Google Maps, Open Street Maps, etc.) transformed outdoor navigation experience. However, indoor navigation lacks as wireless devices (e.g., smartphones, etc.) are unable to navigate to, for example, a conference room in a new building, find a product of interest in a shopping mall, etc. This is because, unlike GPS, indoor navigation lacks both reliable positioning and accurate indoor maps. While recent work built methods to locate smartphones indoors using WiFi signals to median accuracies of tens of centimeters, the errors are much larger (3-5 m) in multipath challenged environments that have multiple reflectors. These errors are reflected in the high 90 and 99-percentiles errors reported by existing systems. These high errors mean that people can be located in entirely different rooms or different hallways when walking indoors. Further, location-referenced indoor maps are scarcely available. In few cases, like airports and shopping malls, search engines and other providers create floor plans, but these floor plans are manually created and often need to be updated as floor plans change and they lack details such as cubicles, furniture, etc.

The current subject matter system provides solution to these problems by providing a data-driven approach for indoor positioning that may implicitly model environmental effects caused by reflectors and obstacles, and thus, improve indoor positioning performance. The current subject matter system further implements deep learning capabilities that combine domain knowledge and neural networks to solve domain-specific problems. Specifically, the current subject matter system uses indoor positioning data in combination with neural networks to deliver indoor positioning performance.

The current subject matter system may also be configured to implement an automated mapping process that may be configured to use one or more of a LIDAR data, an odometer data, and/or any other data for the purposes of executing simultaneous localization and mapping (SLAM) for generating maps (indoor and/or outdoor). The automated mapping process may be generate labeled data for the purposes deep learning training.

FIG. 1 illustrates an exemplary system 100 for executing an automated mapping process (which will be discussed in further detail below), according to some implementations of the current subject matter. The system 100 may include a mapping device 108 that may be equipped with various sensors, processors, motors, and/or any other equipment that may enable it to travel in an space 102 (e.g., an enclosed interior space) along a path 116. The path may be any desired path that the mapping device 108 may select. The space 102 may be configured to include one or more wireless access points 106(a, b, c, d, e). Some access points may have a fixed location and others may be movable (e.g., access point 106d). Some access points (e.g., access point 106a) may be obstructed by various obstruction(s) 112 (e.g., reflectors, walls, antennas, etc.).

The mapping device 108 may be configured to travel along the route 116 from one wireless access device 106 to another. It may also enter an unmapped area 104 that might not have been explored yet. After travelling through the unmapped area 104, the device 108 may be configured to generate a map (and, for example, label it as a "Meeting Room").

The device 108 may be configured to provide the mapping data (e.g., LIDAR data, coordinates, lengths, widths, etc.) to a server 120. The server 120 may be configured to be located remotely from the location 102 and/or on premises at the location 102. The server 120 may be any combination of hardware and/or software and may be configured to execute a deep learning algorithm using mapping data inputs provided by the device 108 to determine exact locations of wireless access points 106 at the location 102. The wireless access point location data and/or mapping data may be supplied to the wireless device 110 (e.g., smartphone, tablet, etc.), which may use it to locate the wireless access points 106 and/or other users, devices, items, etc.

Figure 2A:
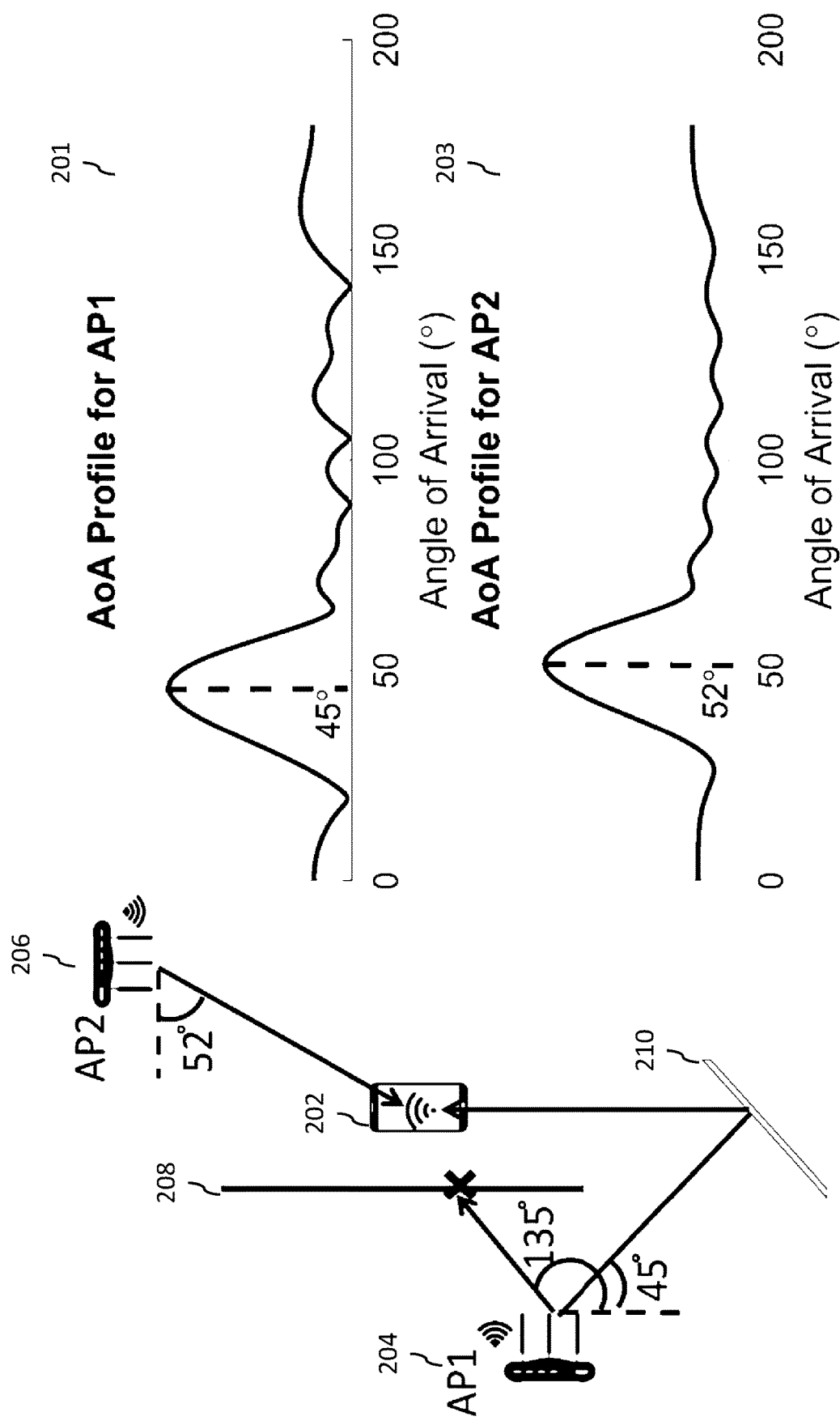
FIG. 2a illustrates an exemplary WiFi-based indoor positioning system, according to some implementations of the current subject matter.
Figure 2B:
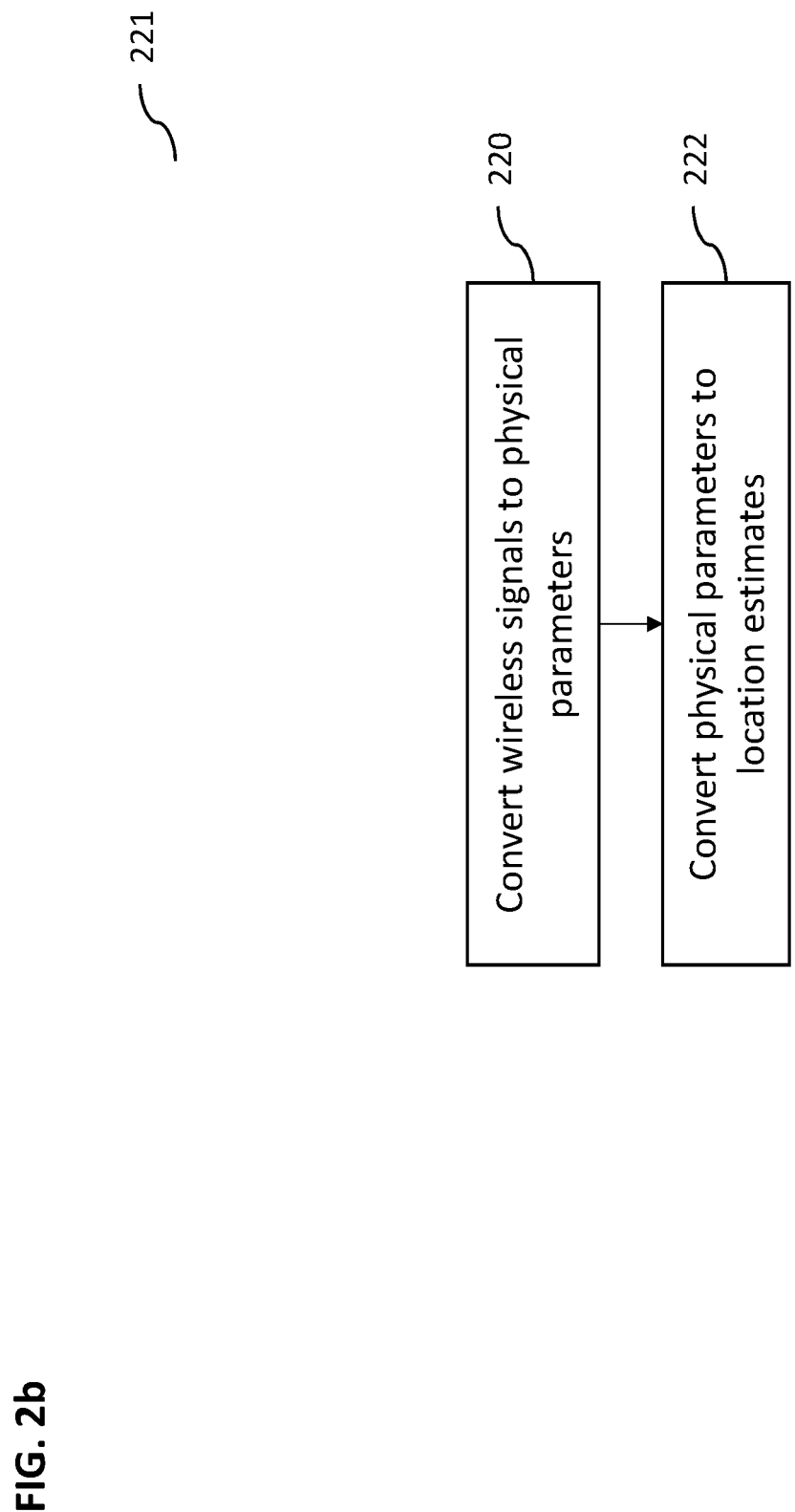
FIG. 2b illustrates an exemplary process for converting signal measurements to location estimates, according to some implementations of the current subject matter.

To determine WiFi-based indoor positioning, WiFi access points may measure WiFi signals emitted by a wireless device (e.g., wireless device 202 shown in FIG. 2a) and convert these signal measurements to location estimates using a process 221, as illustrated by FIG. 2b. At 220, wireless signals received at multiple antennas on an access point 204, 206 may be converted to a physical parameter, e.g., an angle of arrival (AoA) of the signal (as shown by plots 201, 203). This transform may be independent of any environmental variables, and may be a change of signal representation performed using a variant of the Fourier transform. At 222, this physical parameter information may be converted into a location estimate using geometric constraints of the environment, e.g., location of access points. In the absence of reflectors 210 and obstacles 208 (e.g., free space), operation 222 may easily be performed using triangulation of line-of-sight paths. However, when the direct path between the client and the access point is blocked, operation 222 may lead to large errors in location estimates.

However, an accurate location of the wireless device 202 may be identified if, for example, the exact size, shape, and/or location of the reflector 210 was known. More generally, having an accurate model of the environment may enable accurate positioning even when the line-of-sight path is blocked and/or when there are many reflectors present. However, obtaining this information about the environment from WiFi signal measurements may be challenging. This is primarily because radio signals undergo a complex combination of diffraction, reflection, and refraction when they interact with objects in the environment. Modelling these competing effects on wireless signal measurements and then using the measurements to build an explicit model of the environment is an unsolved (and challenging) problem.

In some implementations, to resolve the above issues, the current subject matter system may be configured to use a neural network to generate an implicit model of the environment by observing labelled examples. By observing how the environment impacts the relationship between wireless signals and ground truth locations, a neural network may be configured to learn an implicit representation of the relationship. Then, it may use this representation to identify locations of unlabelled points. Hence, the current subject matter system may be configured to resolve the following challenges: incorporating domain knowledge into the neural network design, providing consistency over access points, and providing automated and mapped training of data collection.

Figure 3:
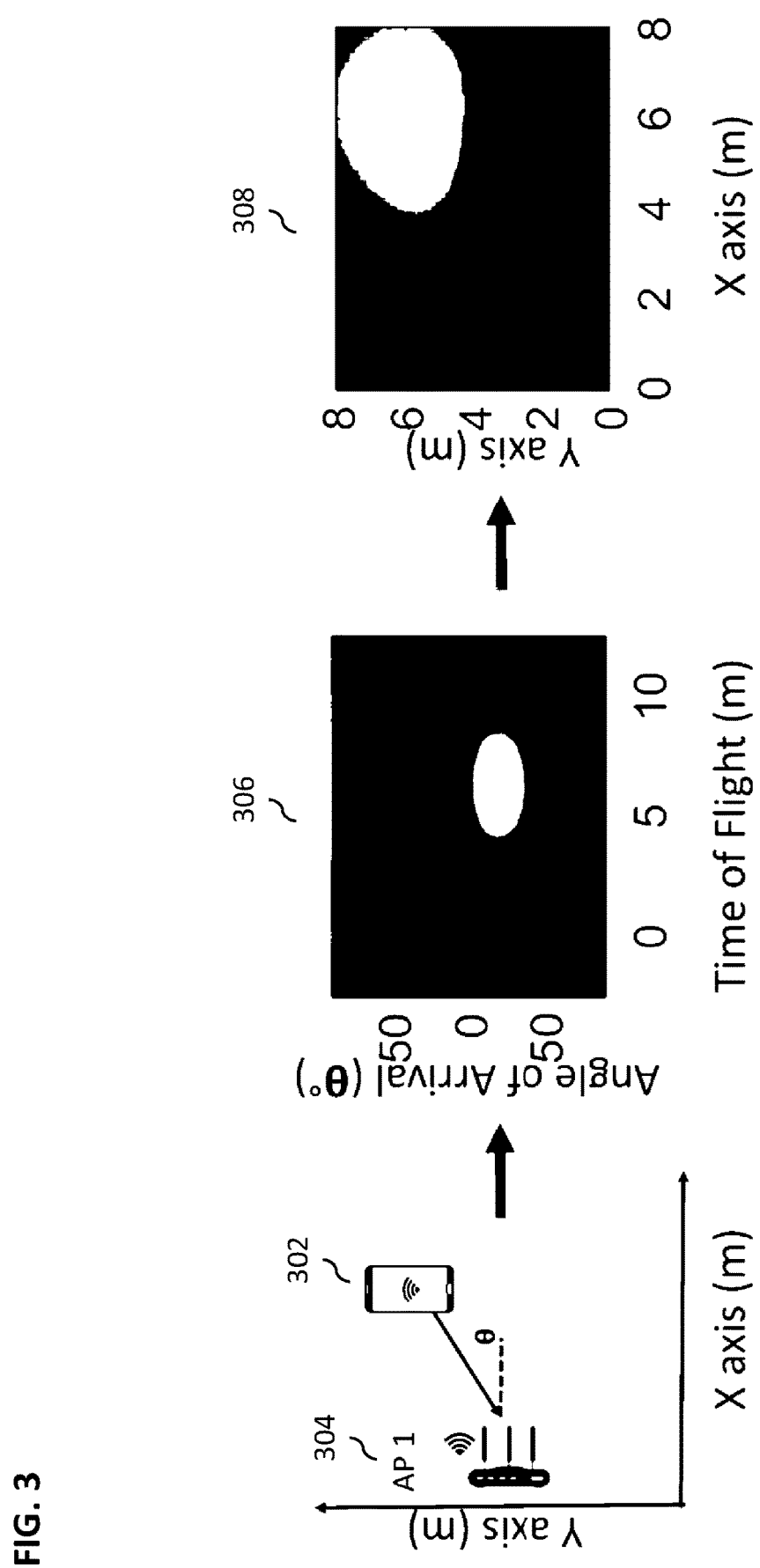
FIG. 3 illustrates an exemplary process for representing represent an input to the neural network as a two-dimensional likelihood heat map, according to some implementations of the current subject matter.

With regard to the first challenge, the current subject matter system may be configured to represent an input to the neural network as a two-dimensional likelihood heat map that may represent angle-of-arrival and time-of-flight (or distance) information (as, for example, is shown in FIG. 3). As shown in FIG. 3, two dimensional heat maps 306 may be used to encode time-of-flight and angle-of-arrival information computed using existing algorithms. These heat maps may be translated to global Cartesian space 308 using polar to Cartesian conversion to encode the access point 304's location. The output of the network may be represented as a two-dimensional Gaussian centered on the target location. This representation may allow use of existing WiFi positioning techniques to generate the input heat maps.

With regard to the second challenge, the current subject matter system may be configured to model an impact of objects in the environment on wireless signals. To do so, the network may be configured to "see" these objects as appearing at the same location consistently across multiple access points. To achieve this, the current subject matter system may be modelled as a single encoder, two decoder architecture. The first decoder may be responsible for enforcing consistency across access points. The second decoder may then identify the correct location by leveraging a consistent model of the environment.

To execute automated and mapped training data collection may be configured to use a device that may be equipped with various sensors and/or equipment (e.g., LIDAR, camera, odometer, etc.) to collect ground truth location estimates for corresponding wireless channels. To optimize the data collection process, the current subject matter system may be configured to execute a path planning algorithm that may minimize a time required to collect an optimal training data for the deep learning algorithm. The path planning algorithm may ensure that an environment is mapped and training data samples are collected within a predetermined period of time (e.g., 20 minutes) for a predetermined area (e.g., 1500 sq. ft. space). This may enable generation of large scale location-referenced channel state information (CSI) data and efficiently deploy the present system in new environments.

In some exemplary, experimental implementations, the current subject matter system was able to achieve (in two different indoor environments spanning 2000 sq. ft. area under 10 different scenarios) a median accuracy of 65 cm ($90^{th}$ percentile 160 cm) as opposed to 110 cm median accuracy ($90^{th}$ percentile 320 cm) achieved by existing systems. In unknown environments, the current subject matter system also performed better than existing systems (91 cm median error as compared to 173 cm). The current subject matter's mapping process mapped 2000 sq. ft. area and collected a total of 150,000 data points across 10 different scenarios taking 20 minutes per scenario. The mapping algorithm's data selection algorithm on an average reduced required path to be travelled by 2.6 times compared to a naïve random walk.

I. Deep Learning Based Localization

Referring to FIG. 1, the current subject matter system 100 may be configured to operate in two phases: a mapping phase and a localization phase. During the mapping phase, the mapping device 108 (e.g., equipped with a WiFi device to collect wireless channel information) may perform an autonomous walk through the space to map the environment. Simultaneously, the WiFi device on mapping device 108 may collect a channel state information (CSI) for WiFi packets heard from all the access points in the environment. At the end of its "walk", the device 108 may generate a map of the environment 102, and a log of the CSI-data collected at different locations. The CSI data may be labeled with the ground truth locations reported by the device 108.

The server 120 may use these CSI-log generated by device 108 to train a deep learning model. This model, once trained, may be used by wireless devices 110 to locate themselves. The devices 110 may also access maps of the environment 102 (or any other environment) by making calls to the server 120.

In free space devoid of reflectors and blockages, wireless channels may be measured at an access point on a given frequency depend solely on the location of the client device. Assuming a client (e.g., a wireless device) is located at location X, then a signal, s, measured at the access point may be written as s=α(X), where α is a function. An objective of any localization system may be to simply model a signal-mapping function that maps signal measurements back to user location. However, this problem is much more complex when there are multiple reflectors and obstacles in place. For example, assuming shape, size, and location of objects in an environment correspond to a set of hyper parameters, Θ, then, the signal s' may be expressed as s'=α '(X; Θ). This mapping from reflectors in the environment to signal measurements is computationally very complex as it requires accounting for effects like reflection, refraction, diffraction, etc. Existing commercial software for modeling such interactions by simulation takes several hours to simulate small, simple environments. To resolve these issues, in some implementations, the current subject matter system may be configured to leverage neural networks to model the signal-mapping function as a black box to generate an implicit representation of the environment, and determine an impact of the environment on the location into the network parameters by observing ground truth data.

Figure 4:
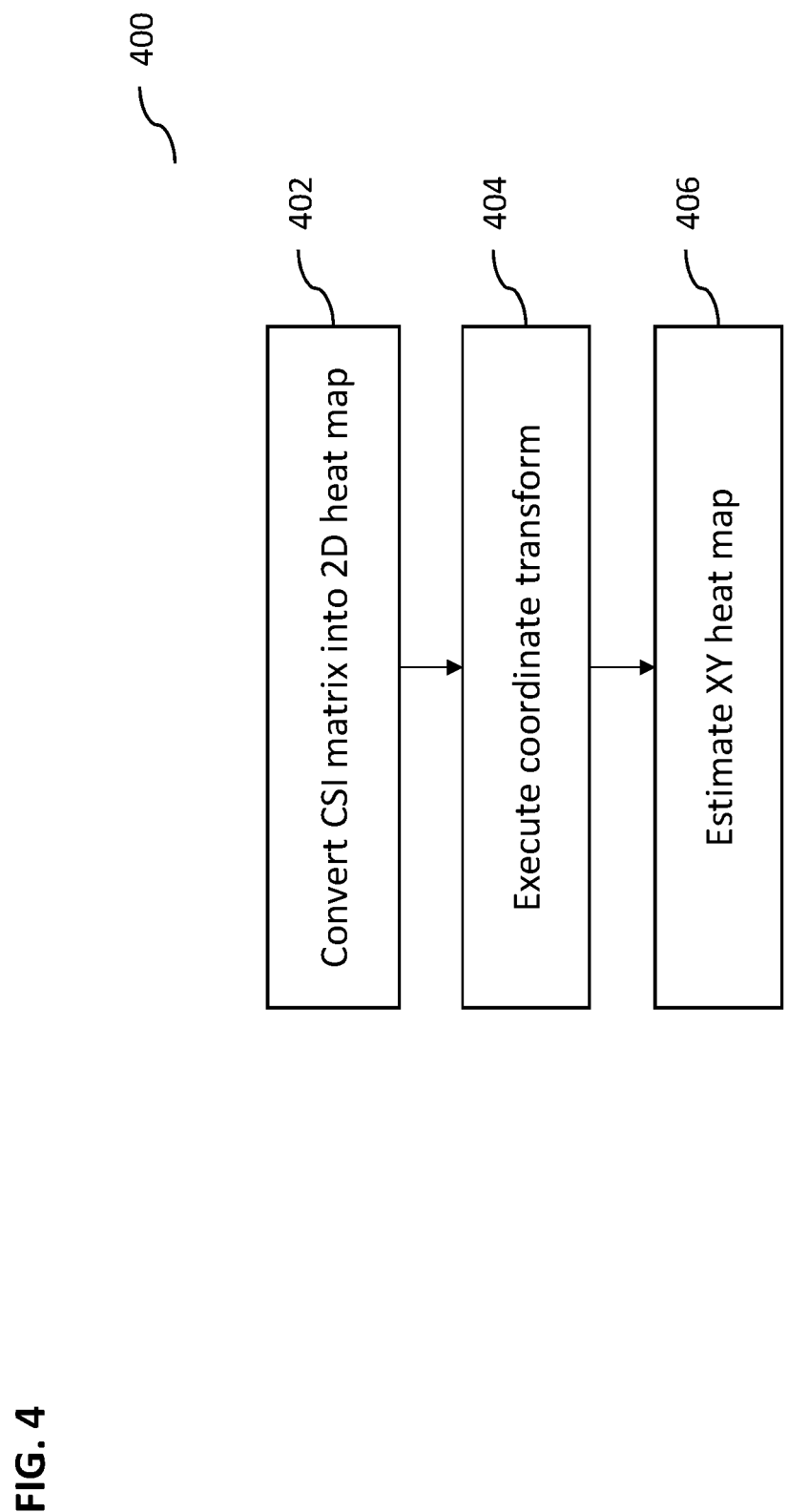
FIG. 4 illustrates an exemplary process for incorporating wireless localization knowledge for input representation, according to some implementations of the current subject matter.

WiFi uses orthogonal frequency division multiplexing (OFDM) to divide its bandwidth (e.g., 20/40/80 MHz) into multiple sub-frequencies (e.g., 64 sub-frequencies for 20 MHz). Thus, the channel state information (CSI) obtained from each access point is a complex-valued matrix, H, having a size $N_{ant} \times N_{sub}$, where $N_{ant}$ is the number of antennas on the access point and $N_{sub}$ is the number of sub-frequencies. The current subject matter system may be configured to use an image-based input representation. FIG. 4 illustrates an exemplary process 400 for incorporating wireless localization knowledge for input representation, according to some implementations of the current subject matter. The process 400 may be performed by one or more of the mapping device 108, wireless device 110, and/or server 120 (as shown in FIG. 1) and/or any combination thereof. The process 400 may be configured to transform CSI data into images. At 402, the CSI-matrix, H, may be converted to a 2D heat map, $H_{AoA-ToF}$, where AoA is the angle of arrival and ToF is the time-of-flight. The heat map may represent a likelihood of device location at a given angle and at a given distance. Conversion of CSI-matrix, H, to the 2D heat map, $H_{AoA-ToF}$, may be achieved using various existing methods. For example, a 2D-FFT transform may be used (as shown, for example, in FIG. 3). While the $H_{AoA-ToF}$ is an interpretable image, it does not yet encode the location of the access points. To encode the location of the access points in these images, a coordinate transform of these images may be executed, at 404. The images may be converted to a global 2-D Cartesian plane. This transform may convert $H_{AoA-ToF}$ to $H_{XY}$, i.e., a matrix that may represent the location probability spread out over the X-Y plane.

To perform this transform, an XY coordinate system may be defined, where the access point's (AP) location is $(x_{ap}, y_{ap})$ and the AoA-ToF heat map is $H_{AoA\text{-}ToF}$. Using this information, the XY heat map, $H_{XY}$ may be estimated using a polar to Cartesian transformation, at 406. Representing the data as $H_{XY}$ may allow combination of data from all access points in the environment (e.g., environment 102 shown in FIG. 1).

Once the above the information is available, the current subject matter system may be configured to generate a deep neural network for executing wireless localization. A target of this network may be an image ($T_{location}$) of the same dimensions as one or more of the input images. Since the network is an image translation network, it may allow generalization to environments of arbitrary size. A separate network for every environmental space need not be generated. Within the target image, instead of just marking the correct location as one and the rest zeros, a target image with the correct location of the user marked as a Gaussian peak may be selected. The Gaussian peak representation is beneficial because it prevents gradient under-flows.

Figure 5:
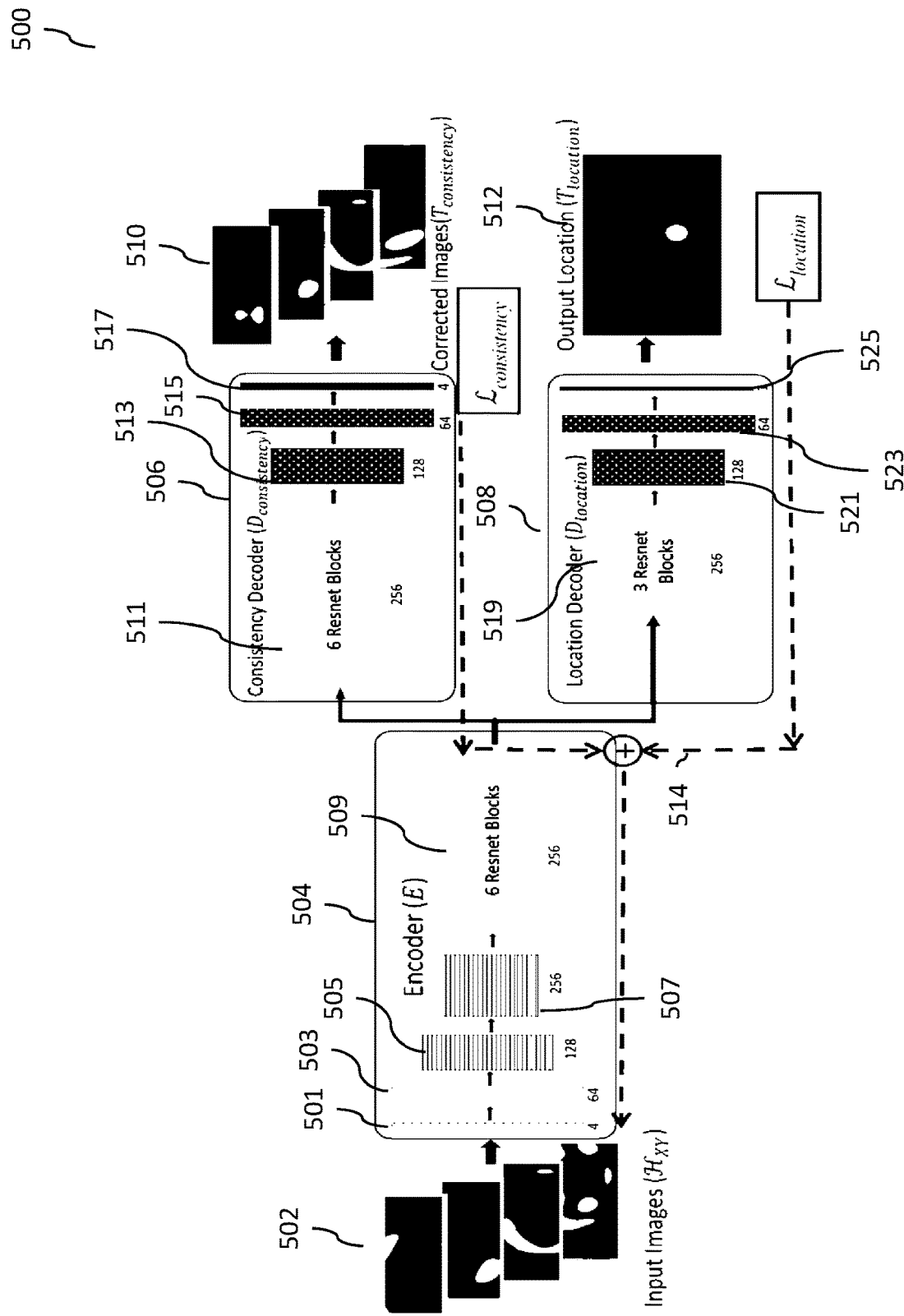
FIG. 5 illustrates an exemplary deep neural network architecture, according to some implementations of the current subject matter.

FIG. 5 illustrates an exemplary deep neural network architecture 500, according to some implementations of the current subject matter. The architecture 500 may be configured to include an encoder component 504 and one or more decoder components 506, 508. The encoder and decoder components 504-508 may be configured as hardware, software, and/or any combination thereof. Components 504-508 may be further disposed on one or more of the devices 108, 110, and/or the server 120. The components 504-508 may be communicatively coupled. The encoder component 504 may be configured to receive input images $H_{XY}$ 502. The decoder components 506-508 may be configured as parallel decoders receiving information from the encoder component 506. The decoder 506 may be configured to generate one or more corrected images 510 ($T_{consistency}$) and the decoder 508 may be configured to generate one or more output location images 512 ($T_{location}$). The output image may be configured to be used to predict location of an access point using a Gaussian peak.

The encoder 504 may be configured to include a 2D convolution layer (Conv2d) components 501-507, where the layers of Conv2d may include a 7×7 kernel and may be followed by the layers including hyperbolic tangent function (Tanh) (instead of the usual rectifier linear unit (ReLU) non-linearity to mimic a log-scale combining across the images over the depth of the network. The encoder 504 may also include one or more residual neural network (Resnet) blocks 509 (e.g., 6 Resnet blocks).

The encoder component 504 may be coupled to the decoder component 506, which may be a consistency decoder network, having one or more Resnet blocks 511 (e.g., 6 Resnet blocks). The decoder component 506 may further include one or more 2D transpose convolution layer components (ConvTrasponse2D) 513, 515, followed by a 2D convolution layer (Conv2d) 517. As stated above, the output of the decoder component 506 may include one or more corrected images 510.

The encoder component 504 may also be coupled to the decoder component 508, which be a location decoder. The decoder component 508 may include fewer Resnet blocks (e.g., 3) than the consistency decoder component 506. Otherwise, the structure of the decoder component 508 may be similar to the decoder component 506. The output of the decoder component 508 may include an output location of an access point image 512.

In some exemplary implementations, each of the Conv2d and ConvTranspose2d layer components above may use the following input parameters: [<kernel-height>, <kernelwidth>, <stride>, <padding>]. The line 514 may represent a loss back-propagation through the network.

In some implementations, the decoder components 506, 508 may be configured to execute localization and space-time consistency processes. The encoder component 504, E: $H \rightarrow \hat{H}$, may use input heat maps 502, H, corresponding to all the APs in the environment 102 and generate a concise representation, $\hat{H}$, that may be fed into the location decoder and consistency decoder components 506, 508. As stated above, H may be a set of $N_{AP}$ heat maps, $H_{XY,i}$, one for $i^{th}$ access point (i=1, 2, ..., $N_{AP}$). The consistency decoder component 506, $D_{consistency}$: $\hat{H} \rightarrow Y_{consistency}$ may be configured to ensure that the network 500 sees a consistent view of the environment 102 across different training samples as well as across different access points. $y_{consistency}$ may be output heat maps, $Y^{i}_{consistency}$, corresponding to all the APs (e.g., $N_{AP}$). It does so by correcting for radial shifts caused because of lack of time synchronization between access points and user devices. The location decoder component 508, $D_{location}$: $\hat{H} \rightarrow Y_{location}$ may take in the encoder representation, $\hat{H}$ and output an estimate for the location, Vocation.

As stated above, the target output of the location decoder may be images that highlight the correct location using a Gaussian representation. The consistency decoder may be trained to input images from multiple access points that have random ToF offsets and output images without offsets. To do so, the network 500 may be configured to consider images from multiple access points. Thus, while radial shifts may be completely random at each access point, when corrected for these radial shifts the images across these multiple access points may have a common peak at the correct user location. To achieve this consistency across multiple access points, it needs training data that has no-offset images as targets. The following discusses generation of no-offset target images using a heuristic.

In some implementations, the system 500 may be configured to receive images with offsets and corresponding ground truth locations for the training data. This information may be used to generate images without offsets as follows. The image with offsets may be used to identify the direct path. The direct path may have the same angle as the correct ground truth location but may have a different ToF. Within paths along the same angle, the smallest ToF path may be selected as the direct path. Assuming that the direct path has ToF $\tau'$, the system 500 may then determine a distance between the ground truth location and the access point and divide it by the speed of light to obtain the expected ToF, i.e., $\hat{\tau}$. Then, the offset may be expressed as $\tau' - \hat{\tau}$. Every point on the image may be shifted radially (e.g., to reduce/or increase its distance from the origin) by this offset to correct for the offsets and generate an offset compensated image. This offset compensated image may be denoted as a matrix, $T_{consistency}$. The network 500 may use all $N_{AP}$ access points to check that it applied the correct offsets by looking for consistency across the $N_{AP}$ different APs.

For both the location and consistency decoders 506, 508, inputs and targets may be images. Hence, L2 comparative loss may be used for both decoders. Since the location network's output may be sparse, L1 regularization may be used on its output image to enforce sparsity. The loss of the consistency decoder 506, $L_{consistency}$, may be defined as:

$$L_{consistency} = \frac{1}{N_{AP}} \sum_{i=1}^{N_{AP}} L2[D_{consistency}(E(H)) - T_{consistency}]_i \quad (1)$$

where $N_{AP}$ is the number of access points in the environment and $T_{consistency}$ is the offset compensated image. $H=[H_{XY,1}, H_{XY,2}, \ldots, H_{XY,N\text{-}AP}]$ denotes the input to the network and $D_{consistency}$ (E(H)) is the output of the consistency decoder once it has been applied to the encoded version of H.

Similarly, the loss of the localization decoder may be defined as:

$$L_{location} = L2[D_{location}E(H) - T_{location}] + \lambda \times L1[D_{location}E(H)] \quad (2)$$

where $T_{location}$ may be the target outputs (Gaussian-representation of ground truth locations). The overall loss function is a sum of both $L_{location}$ and $L_{consistency}$ described above.

In some implementations, during the training phase, labeled CSI data and the ToF offset compensated images may be used to train system 500 end-to-end, where the losses flow and update the network weights as shown by the line 514 in FIG. 5. With the loss functions defined as above, the network learns to remove the ToF offsets utilizing the consistency decoder 506. Since the offset loss and location loss add up to update the encoder 504, the location decoder 508 may access the information regarding ToF offset compensation, thereby enabling it to learn and predict accurate user locations.

In some implementations, the system 500 may executed a test phase. Once the model is trained, the consistency decoder 506 may no longer be needed, whereby the information from the rest of the network 500 is stored and may continuously run on the server 120 to which the access points 106 may report their CSI estimates from the client (e.g., device 110) associated to them. Then, the server 120, upon request, may communicate to the client, its location. The server 120 may also send the map generated by the mapping process corresponding to the APs location.

II. Autonomous Mapping and Data Collection

Localization of a device is one part of the indoor navigation challenge. The other part is getting access to indoor maps. Descriptive indoor maps, rich in feature information and landmarks, are scarcely available. Further, manually generating these maps becomes increasingly expensive in frequently re-configured environments, e.g., grocery stores, shopping malls, etc. Additionally, when designing neural networks, a key challenge is the cost of collecting data. Naturally, if one was to manually move around with a phone in their hand to thousands of locations and measure the ground truth locations, it would take a long time to generate enough data to train a model for the system 500.

In some implementations, the current subject matter system may be configured to resolve this problem by providing a mapping and automated data collection process. The process may be configured to be an autonomous process for collecting location-associated wireless channel data (CSI data). The data-association between CSI and the map may allow system 500 to provide map-referenced locations. Further, the process may be configured to provide accurate data, where collected CSI is reliable and may be labeled with accurate location of the WiFi device. The process is further efficient as it may be configured to collect a diverse set of data points for system 500 in short time (e.g., within an hour or two). The process may be also easily adaptable to any future WiFi localization algorithms.

Figure 6:
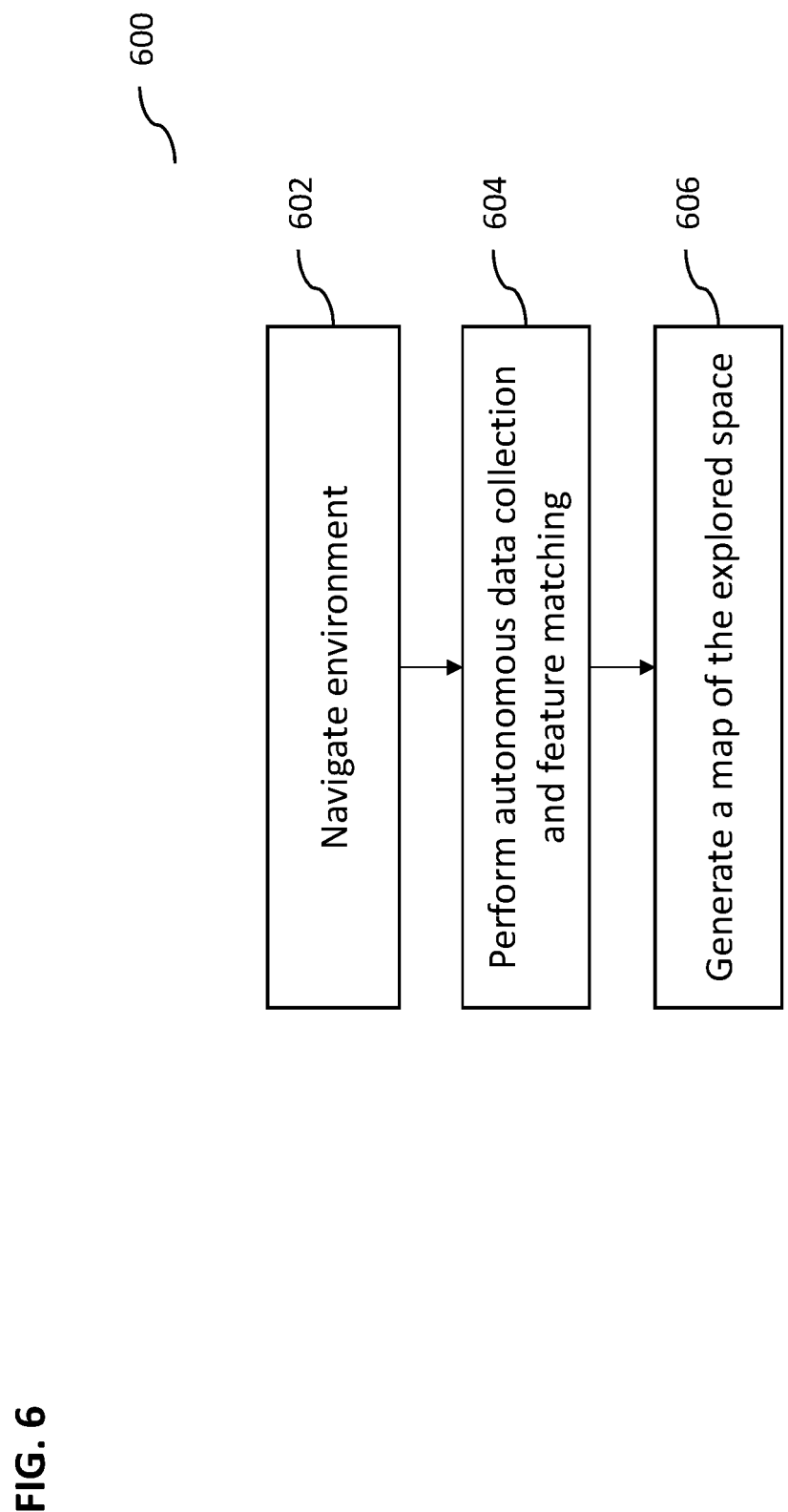
FIG. 6 illustrates an exemplary mapping process, according to some implementations of the current subject matter.

The process may be executed by the device 108 (shown in FIG. 1). It may be configured to use simultaneous localization and mapping (SLAM) that uses autonomous robots equipped with LIDARs, RGBD cameras, gyroscopes, odometers, etc. to navigate an environment. In some implementations, to achieve autonomous navigation, the mapping process may be executed as shown in FIG. 6. At 602, the device 108 may be configured to navigate the environment 102. In this stage, SLAM may work by capturing data from device 108's sensors and combining this data into an accurate map of the environment. Next, at 604, during the autonomous data collection phase, the process 600 may use this map to match features it has previously seen before to accurately localize itself in real time.

In addition to obtaining location information from the SLAM frameworks, the device 108 may be equipped with a WiFi device to collect CSI and tag each CSI measurement with the location measurement. The local coordinate systems of the access points deployed in the environment 102 may be aligned with global coordinates used by the process 600. Further, to synchronize timestamps across the device 108 and the access points 106, one instance of data for each of these access points may be collected at the start of the data collection. This may be used as a synchronization packet (e.g., 'sync-packet'), which may provide a start time across all the access points and the device 108. This consistent time stamp may allow association of each CSI measurement with a location provided by the process 600. As a result, at 606, the process 600 may be configured to generate a map of the space explored by the device 108 and the location-referenced CSI data of the environment 102.

Figure 7:
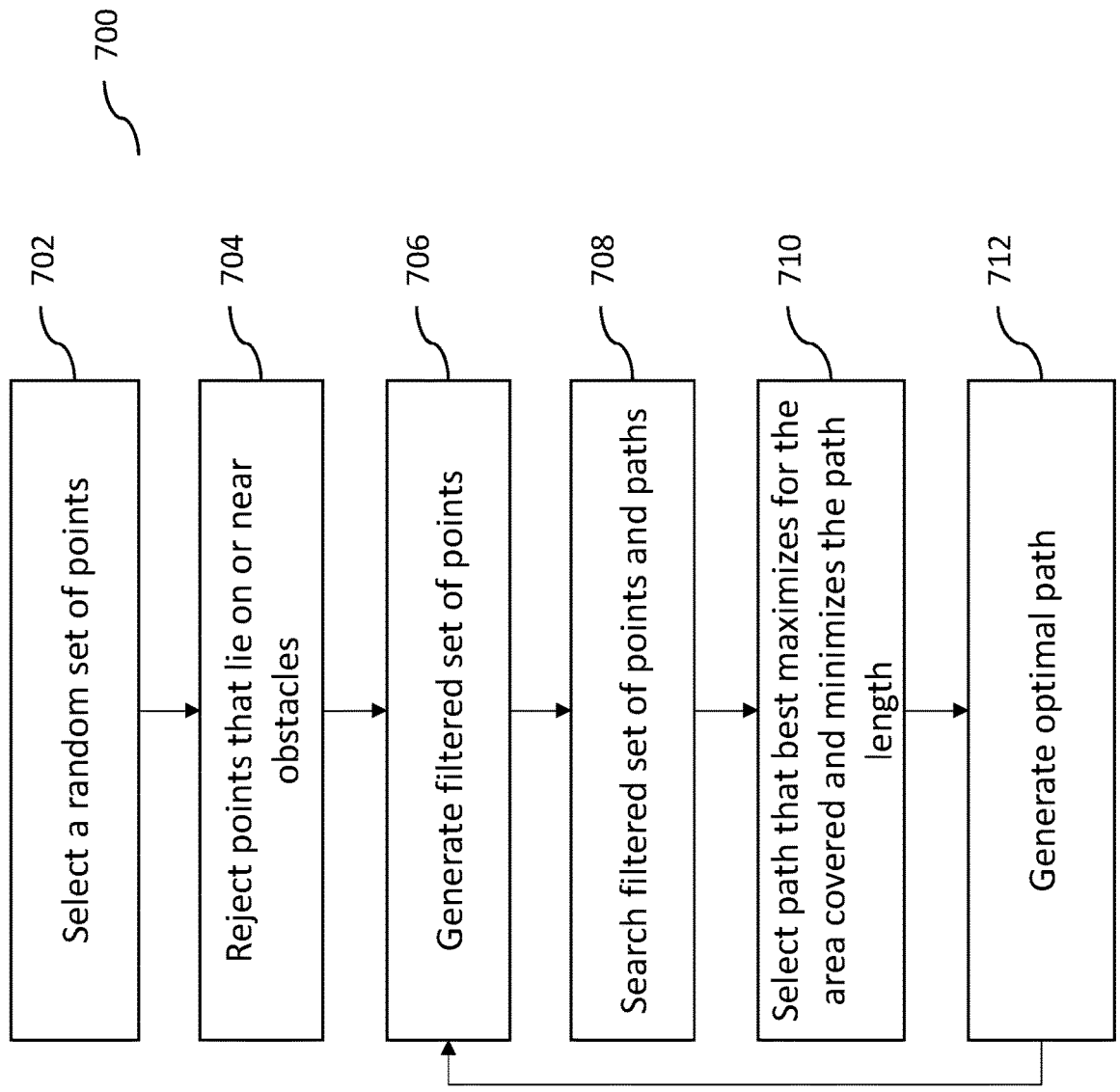
FIG. 7 illustrates an exemplary path planning process, according to some implementations of the current subject matter.

In some implementations, the current subject matter system may be configured to execute a path planning process 700, as shown in FIG. 7, to generate data for the purposes of training the system 500 shown in FIG. 5. The data collected during mapping alone might be insufficient to train the model as it might not have enough diverse examples to allow the system 500 to perform accurate localization. Hence, the process 700 provides an efficient data collection mechanism that allows collection of diverse training data for new environments. The process 700 may be executed by one or more of the devices 108, 110, and/or server 120, as shown in FIG. 1, and/or any combination thereof. The process 700 may be configured to balance optimization of the path length, area covered and the computation required.

Referring to FIG. 7, at 702, a random set of points $P=\{(x_i, y_i) | i \in [1, 2, 3, \ldots, N]\}$ may be selected. At 704, points which lie on or near any obstacles identified in the occupancy grid may be rejected. At 706, a filtered set of points $P^F=\{(x_i, y_i) | i \in [1, 2, 3, \ldots, N']\}$ may be generated To approximate an optimal path in the environment 102, at 708, the process 700 may perform a search over the filtered set of points that are closest point to a current point and a search of all paths which pass through d nodes. Then, an m-ary tree may be setup to a depth d and the path which best maximizes for the area covered and minimizes the path length may be selected, at 710. This may be accomplished by starting from an origin $p_0=(x_0, y_0)$ and find the m closest points in $P^F$ and labelling it $P_1$. Using a probabilistic road map (PRM), a trajectory to each of these points may be traced. For each of these paths, the path length $L^1_{1i}$ and coverage $C^1_{1i}$ may be determined. Here, coverage of a path is the neighboring space within a radius RCSI traversed by the device 108. The channel within RCSI of the WiFi device on the device 108 may be approximately constant. To maximize coverage and simultaneously minimize the path length, and hence define the following ratio $$R_{1i}^1 = \frac{C_{1i}^1}{L_{1i}^1}, \forall i \in [1, 2, \ldots, m] \quad (3)$$

The above may define computation for the depth 1. This process may be performed in a recursive manner, for each of them points, up to a depth d. Hence, at any depth $1 < k \leq d$, there are $m^2$ ratios for paths between the points in $P_{k-1}$ and $P_k$ as follows $$R_{ij}^k = \frac{C_{ij}^k}{L_{ij}^k}, \forall i, j \in [1, 2, \ldots, m] \quad (4)$$

Now, at each depth k and for the path between $p_i \in P_{k-1}$ and $p_j \in P_k$, the m paths may be concatenated given by the lower rung of the recursion with the current path. Next, among the m paths, the path which maximizes $R_{ij}^k$ to the upper rung of the recursion may be returned. The points in $P^F$, which lie within RCSI of this path may be filtered to reduce an overlap of paths down the line. Hence, $p_i \in P_{k-1}$ receives m paths from depth k's m points, and the recursion may continue. Note that at depth d, the process 700 may return $R_{ij}^d = 0$, $\forall 1 \leq j \leq m$. At the end of the recursion, an approximate optimal path from $p_0$ to some $p_f \in P_d$ may be generated, at 712. For the next iteration, the above procedure may be repeated starting at $p_f$ and continued until required coverage is obtained or all points in $P^F$ are traversed.

III. Reverse Localization

Figure 8:
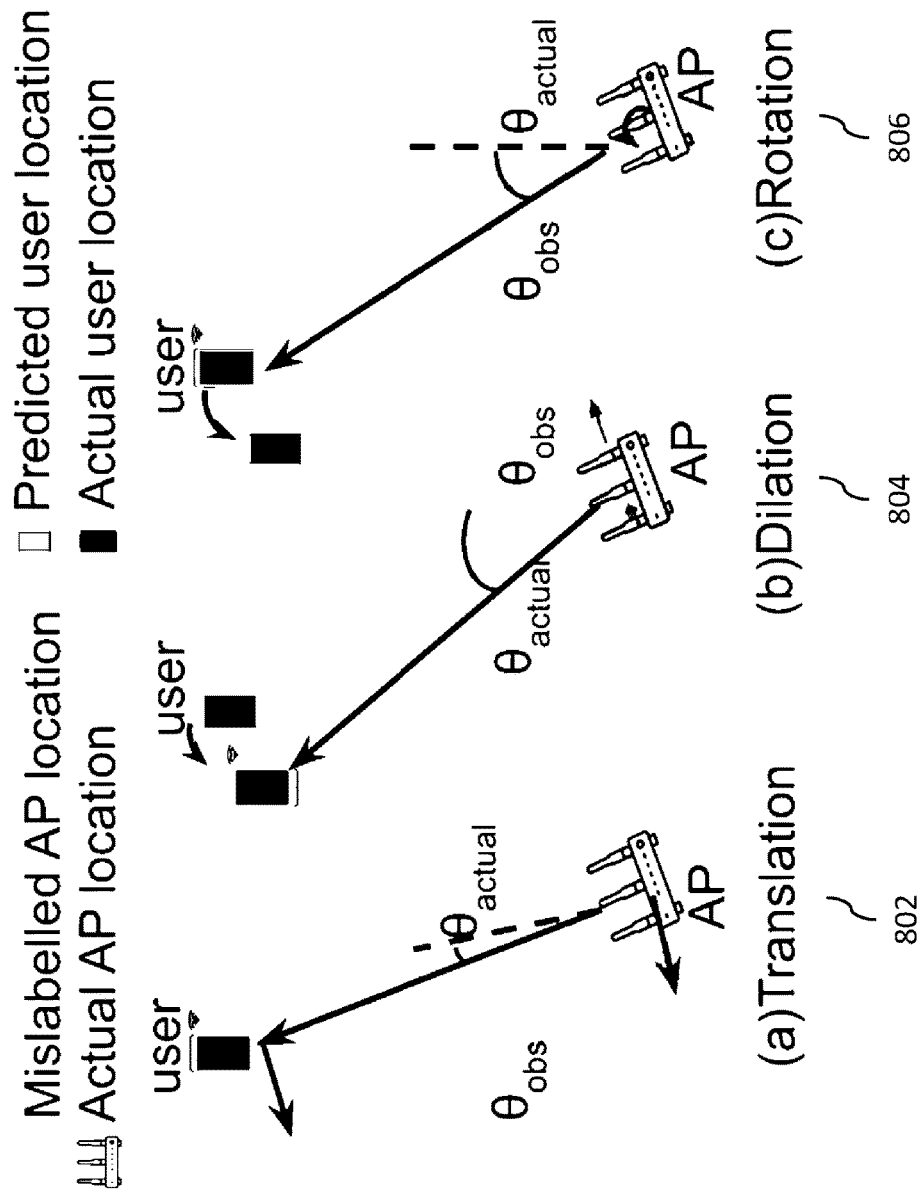
FIG. 8 illustrates an exemplary reverse localization process, according to some implementations of the current subject matter.

In some implementations, the current subject matter relates to an autonomous and accurate system for estimating access point location attributes, such as, access point location, antenna placements, and deployment orientation. This process of predicting accurate access point attributes may be referred to as reverse localization. Reverse localization may be configured to achieve one or more of the following: accurate access point locations, accurate antenna separation, accurate deployment orientation, and automation. As shown in FIG. 8, at 802, any error in access point (AP) location may be translated to an error in the location of the user device. Thus, any error exceeding a few tens of centimeters in access points' location may adversely affect the decimeter-level user localization. Further, different APs may have different antenna placement configurations and the angle made by the user may be measured at the access point using the spacing between antennas. Hence, any error in measuring antenna placements may cause a rotation error at the user (at 804 as shown in FIG. 8). For example, error in antenna separation by 4 mm may causes 12° of error in the angle of user measured at the access point, which may translates to up to 1 m of error for a user 5 m away from the access point. Moreover, access points may be placed in any orientation in the environment. Any error in measurement of orientation (at 806 as shown in FIG. 8) may directly translate to the predicted angle subtended by the user at the access point. Hence, even 10° of error in deployment orientation may cause up to 90 cm of user location error for a user located just 5 m away from the access point.

Figure 9A:
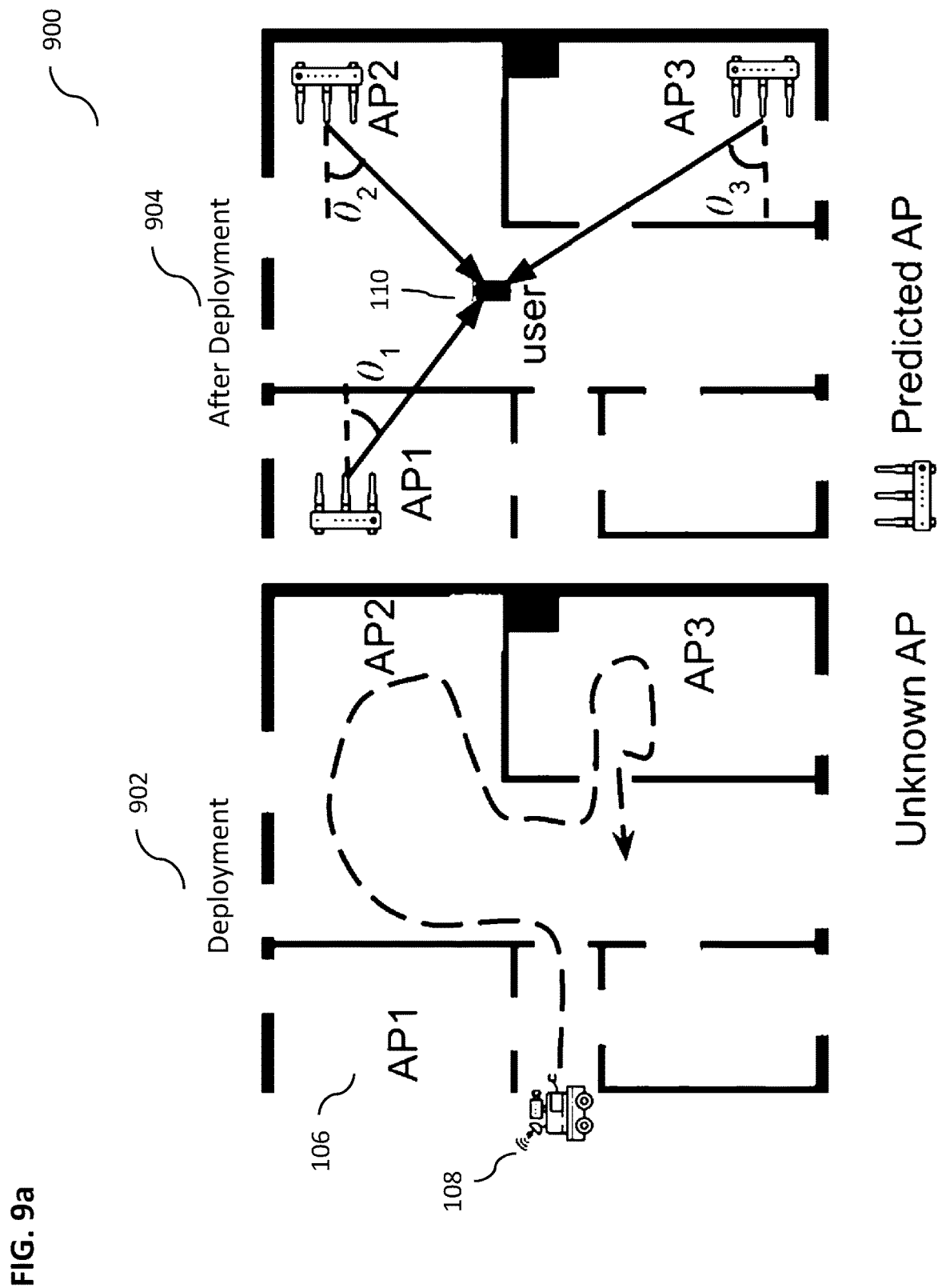
FIG. 9a illustrates an exemplary process for mapping a physical environment, according to some implementations of the current subject matter.

In some implementations, the current subject matter's reverse localization resolves the issues shown in FIG. 8 and achieves location of access points within a very small distance (e.g., tens of centimeters), predicts accurate antenna separation (e.g., within few millimeters), and resolves deployment orientation (e.g., within 10° of error). Moreover, autonomy may be achieved by deploying the reverse localization process on device 108 and/or device 110 shown in FIG. 1, where the device may include a multi-antenna WiFi device. As per discussion above, when deployed in a new environment (as shown at 902 in FIG. 9a), the device 108 may map the physical environment. Next, it may associate with existing AP infrastructure by collecting multi-antenna channel state information, and pairing it with its predicted location in the physical map as shown in FIG. 9a, at 904. This information may be used to build a database of the deployed WiFi infrastructure including of all the access point attributes meeting the above accuracy requirements. This database of accurate AP location attributes may then be used for decimeter level user localization, as shown in FIG. 9a, at 904.

Thus, the reverse localization process may be configured to achieve cm-accurate access point localization by leveraging CSI data collected by the device 108 at many (e.g., 100's) of predicted locations, mimicking these virtual antennas with known locations. Further, the reverse localization process may implement a weighted localization algorithm, which weights each location-CSI data-point with a uniquely defined confidence metric capturing the accuracy of the predicted location. The reverse localization process further achieves mm-accurate antenna geometry localization by localizing relative antenna geometry between two antennas, because the relative wireless channel between the two antennas may be measured very accurately by measuring their phase information. The phase information may be measured at the carrier frequency level (e.g., $\lambda = 60$ mm equivalent to 360°), hence, even phase measurement accurate to 10's of degrees achieves 1-2 mm accuracy. However, this works for only relative antenna separation $d < \lambda/2$. Reverse localization process may be configured to use relative channel information across multiple bot locations to solve for any antenna geometry, unrestricted by antenna separation, to mm-level accuracy. Additionally, the reverse localization process achieves automation, thereby augmenting the SLAM algorithms. The device 108 may be configured to generate a physical map and location and heading of the device 108 in the physical map at all times. The location-heading measurements may be then paired with the CSI collected by the mounted WiFi device. A confidence metric that uses a covariance of measurements across consecutive frames may be implemented. The reverse localization process does not require any modification of the existing access points.

In some exemplary experimental implementations, the reverse localization process was able to achieve relative reverse localization for the antenna separation with a median error of 3 mm (50× improvement over existing systems), and a median error of 3° (8× improvement over existing system) for deployment orientation. It was also able to achieve reverse localization of the access points with a median localization error of 13.5 cm improving by 35% over existing WiFi localization algorithms.

Figure 9B:
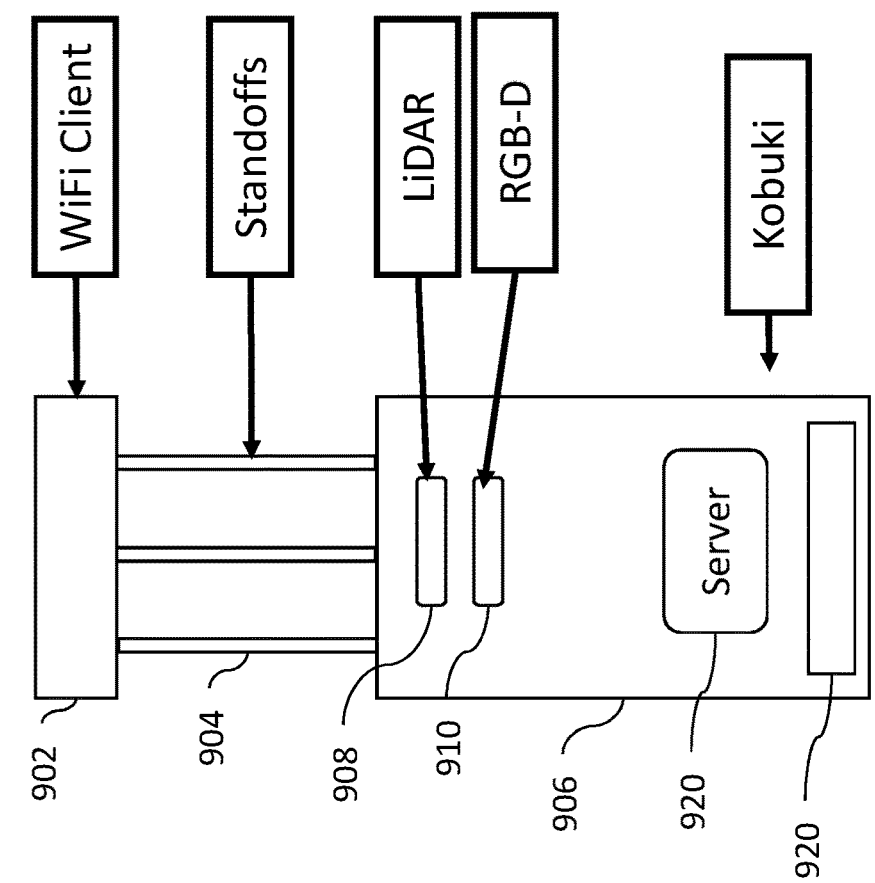
FIG. 9b illustrates an exemplary mapping apparatus for mapping a physical environment, according to some implementations of the current subject matter.

FIG. 9b illustrates an exemplary mapping device 108 that may be used for mapping a physical environment (e.g., environment 102 shown in FIG. 1), according to some implementations of the current subject matter. The device 108 may be configured to include a wireless component (e.g., a WiFi client) 902 and a housing 906. The wireless component 902 may be configured to be coupled to the housing 906 using one or more stands 904. Alternatively, the wireless component 902 may be incorporated into the housing 906 and/or attached to the surface of the housing 906 (at any location).

The housing 906 may be configured to include one or more sensors 908, 910, cameras, graphics processing components, processing components, navigation system components, wireless signal processing components, motors, and/or any other electronics components. The sensors 908, 910 may include one or more of the following: a LIDAR sensor, a scanning sensor, a positioning sensor, a navigational sensor, a sound navigation ranging sensor, and/or any other sensors. The wireless signal processing components may include one or more software, hardware, and/or any combination thereof that may be required for receiving, transmitting, and/or processing of wireless signals.

The sensors 908, 910 may also include one or more camera and/or associated hardware and/or software components. For example, these may include range imaging cameras, such as, a RGB-D camera, a 3D scanner, a depth map device, a Kinect device, a laser rangefinder, a light-field camera (e.g., plenoptic camera), a photogrammetric device, a time-of-flight camera, a laser dynamic range imaging device, a CCD camera, and/or any other optical devices.

The housing 906 may also be configured to include one or more motion components 922. The motion components 922 may be configured to provide mobility to the device 108, such as for moving around the environment 102 (not shown in FIG. 9b). The motion components 922 may be configured to include one or more electro-mechanical motors, batteries, wheels and/or other components that may be configured to operate to allow the device 108 to perform autonomous collection of data (e.g., wireless channel data, mapping data, imagery, etc.) related to the environment 102.

Further, the housing 906 may also incorporate a server 920. The server 920 may be similar to the server 120 shown in FIG. 1 and may be configured to execute one or more processes described herein. In some implementations, the server 920 may be the only server used in the system 100, whereby the device 108 may autonomously collect data relating to the environment and process it (e.g., generate maps, locations of wireless access points, etc., as described herein). Alternatively, or in addition to, the server 920 may be separate from the device 108 (as for example, is shown in FIG. 1), where the device 108 may be configured to communicate the data that it collects to the externally positioned server 920. Moreover, in some exemplary implementations, the server 120 and the server 920 may be separate servers, where the server 120 may be externally positioned to the device 108 and the server 920 may be incorporated into the device 108, where the servers 120 and 920 may be configured to communicate with one another for the purposes of processing various data.

Figure 10:
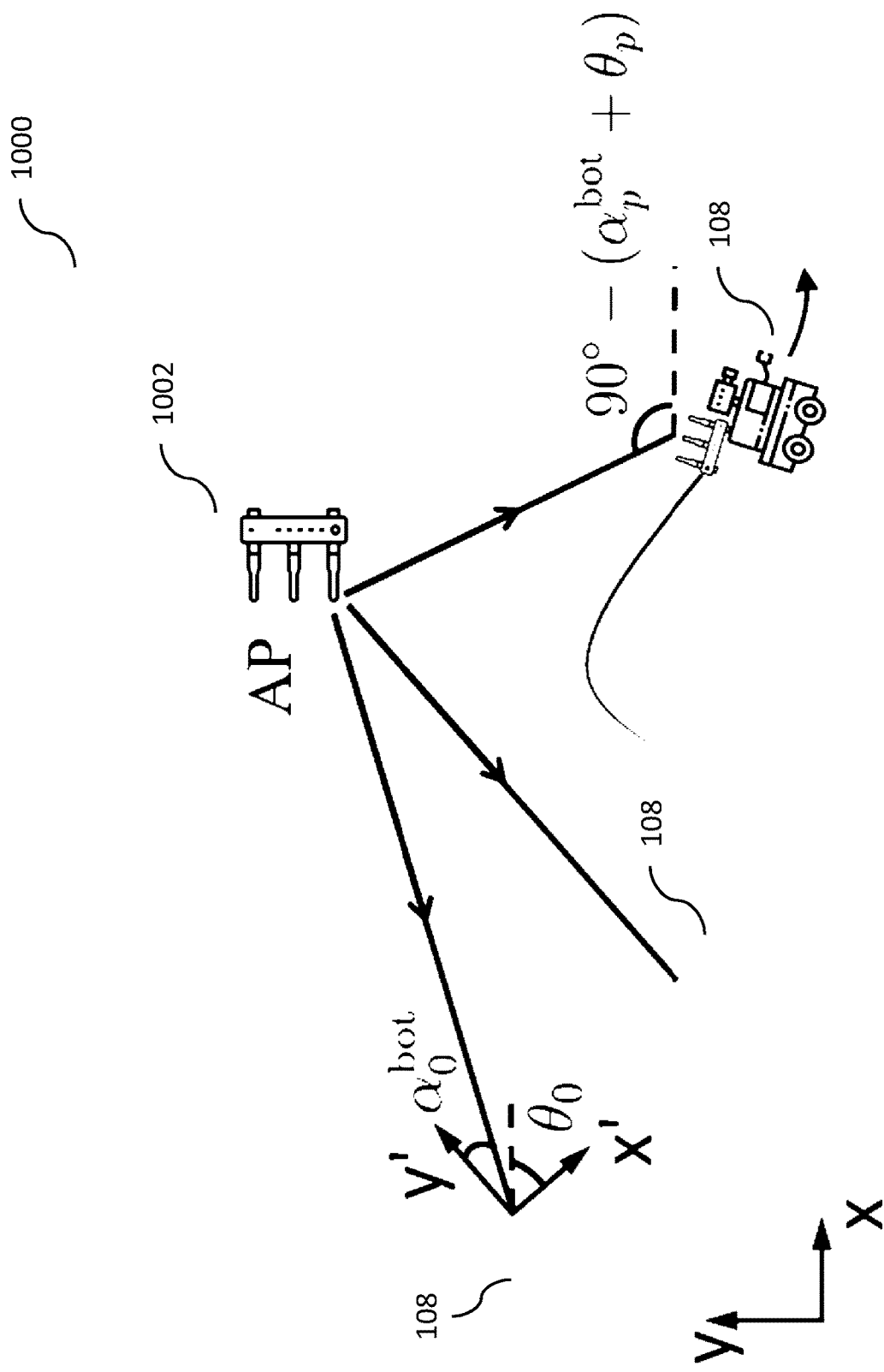
FIG. 10 illustrates an exemplary system for identification of a position of first access point's antenna, according to some implementations of the current subject matter.

In some implementations, the current subject matter system may be configured to identify a position of one or more of the access point's antenna. The identification may be performed by the device 108, device 110 and/or server 120, as shown in FIG. 1. This position of the antenna may then be representative of the access point's location, and may be referred to as the first antenna. FIG. 10 illustrates an exemplary system 1000 for identification of a position of first access point's antenna, according to some implementations of the current subject matter. As shown in FIG. 10, the device 108 ("bot") may be configured to collect CSI data from the deployed access point 1002 at multiple anchors. The device 1002 may cover a large area setting up many (e.g., 100's) anchors which may aid in cm-accurate first antenna localization.

Using the data collected by the device 108, the system 100 may then execute an angle of arrival estimation and determine a direct path's AoA, $\alpha^{bot}_p$ for $p^{th}$ bot 108 location (p=1, 2, ..., P). The AoA's may be measured with respect to the bot's local axis (X'-Y') corresponding to the first antenna's transmission for each bot location $u_p = [u_p, v_p]$. To enable the AoA based first antenna triangulation, the device 108 may report its direction of travel ($\theta_p$) with respect to the global axis (as shown by X-Y in FIG. 10). Thus, the first antenna location may be determined as an intersection of P lines as follows:

$$\text{Line}_p \equiv (y_1 - v_p) = \tan(90° - (\alpha^{bot}_p + \theta_p))(x_1 - u_p) \quad (5)$$

A confidence metric, $w_p \in [0, 1]$ for each device 108 location $u_p$ may be used (as will be discussed below). The confidence metric may indicate that the device 108 may be more confident with the reported position the closer it is to one. A low-confidence rejection algorithm may be executed, whereby it may reject the measurements with confidence metrics, $w_p$, below a predetermined threshold (e.g., in the lowest 20% (using only [0.8×P] lines)). The confidence metrics may be used to determine a weighted least squares problem to optimally solve for the first antenna location as follows:

$$\min_{x_1} \|W(Sx_1 - t)\|^2 \quad (6)$$

where $x_1 = [x \ y]^T$ is the first antenna location, $W = \text{diag}(w_1, w_2, \ldots, w_{0.8P})$ is the weight matrix, $S(p, :) = [\cos(\alpha^{bot}_p + \theta_p) - \sin(\alpha^{bot}_p + \theta_p)]^T$ and $t(p) = [u_p \cos(\alpha^{bot}_p + \theta_p) - v_p \sin(\alpha^{bot}_p + \theta_p)]$. Thus, the first antenna's location $x_1$ corresponding to the access points location may be estimated.

In some implementations, the current subject matter system may be configured to determine antenna separation and deployment orientation. As described above, the movement of the device 108 may be leveraged to identify an accurate location of one antenna on the access point 1002. This may be accomplished through measurement of relative antenna separations, $d_i$, and deployment orientations, $\Psi_i$, for all the $N_{AP}$ antennas on the access point 1002 with respect to the first antenna (i=2, 3, ..., $N_{AP}$).

Figure 11A:
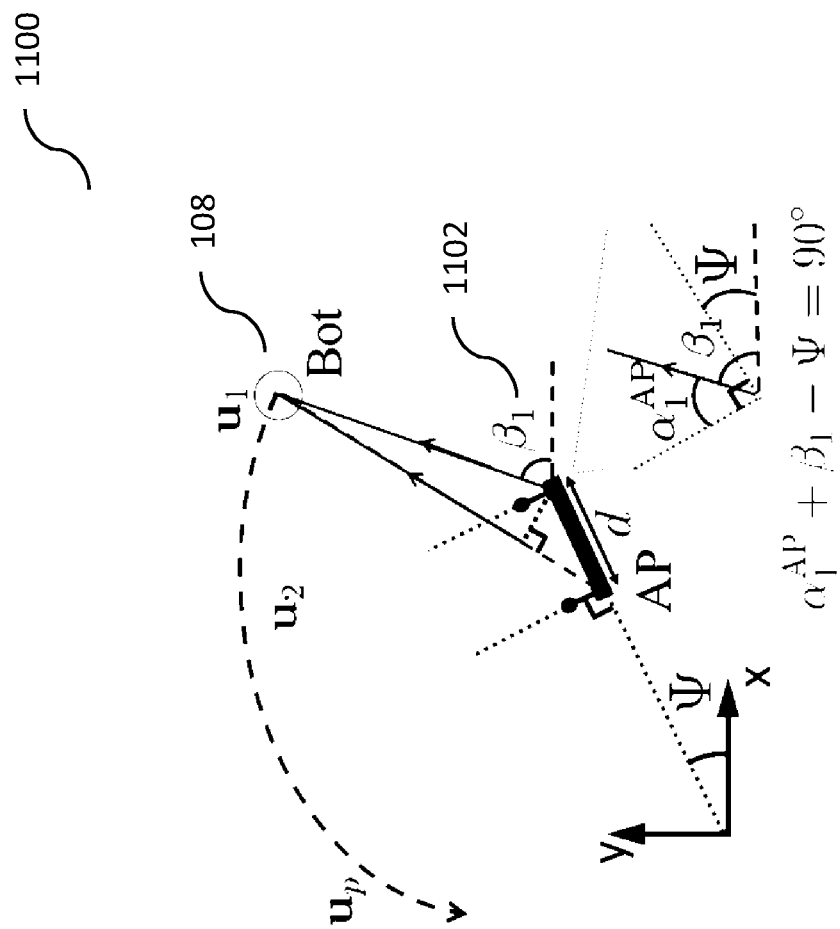
FIG. 11a illustrates an exemplary movement of a wireless device in a circular arc, according to some implementations of the current subject matter.

Unfortunately, although the relative phase information can resolve relative antenna separation to within 2 mm, it cannot resolve for antenna separations greater than $\lambda = 2$. To further understand this, consider an example scenario where the device 108 is moving in a circular arc about the two-antenna access point in steps of small angles, as shown in FIG. 11a. For ease of illustration and discussion only, a two-antenna access point 1102 is shown in FIG. 11a and access point's antenna indexing, i, is not shown or used in the discussion below. The analysis performed with respect to the first antenna in the system may be performed pairwise on all other antennas on the access point. Thus, to locate the second antenna with respect to the first antenna, relative phase across these two antennas may be analyzed. Based on the device 108's location, $u_p$, the phase difference between these two antennas corresponding to the direct path, $\Delta\varphi_p$, may be determined as follows:

$$\Delta\phi_p = \text{mod}\left(\frac{2\pi d}{\lambda}\sin(90° - (\beta_p - \Psi)), 2\pi\right) \quad (7)$$

where, the parameters of interest Ψ and d are antenna deployment orientation (with respect to the X-axis) and antenna separation respectively. $\beta_p$ is the angle subtended by the device 108's location at the access point 1102 with respect to the global X-axis. As shown in FIG. 11*a*, the angle of departure from the AP may be expressed as follows:

$$\alpha_p^{AP} = 90° - (\beta_p - \Psi) \tag{8}$$

Figure 11B:
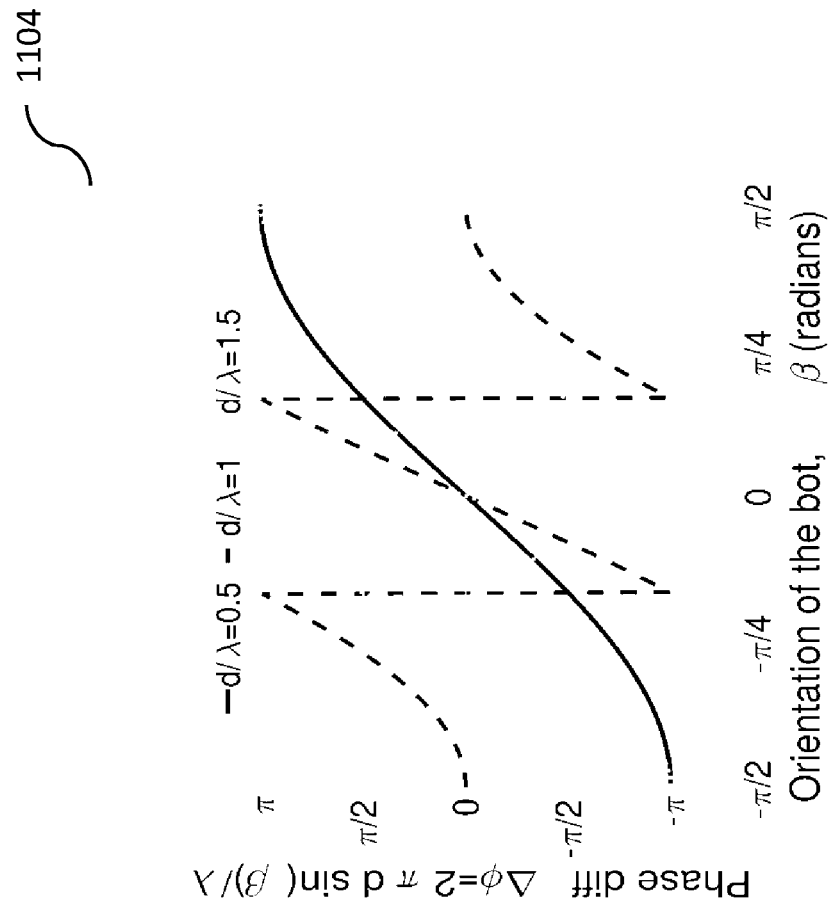
Figure 11C:
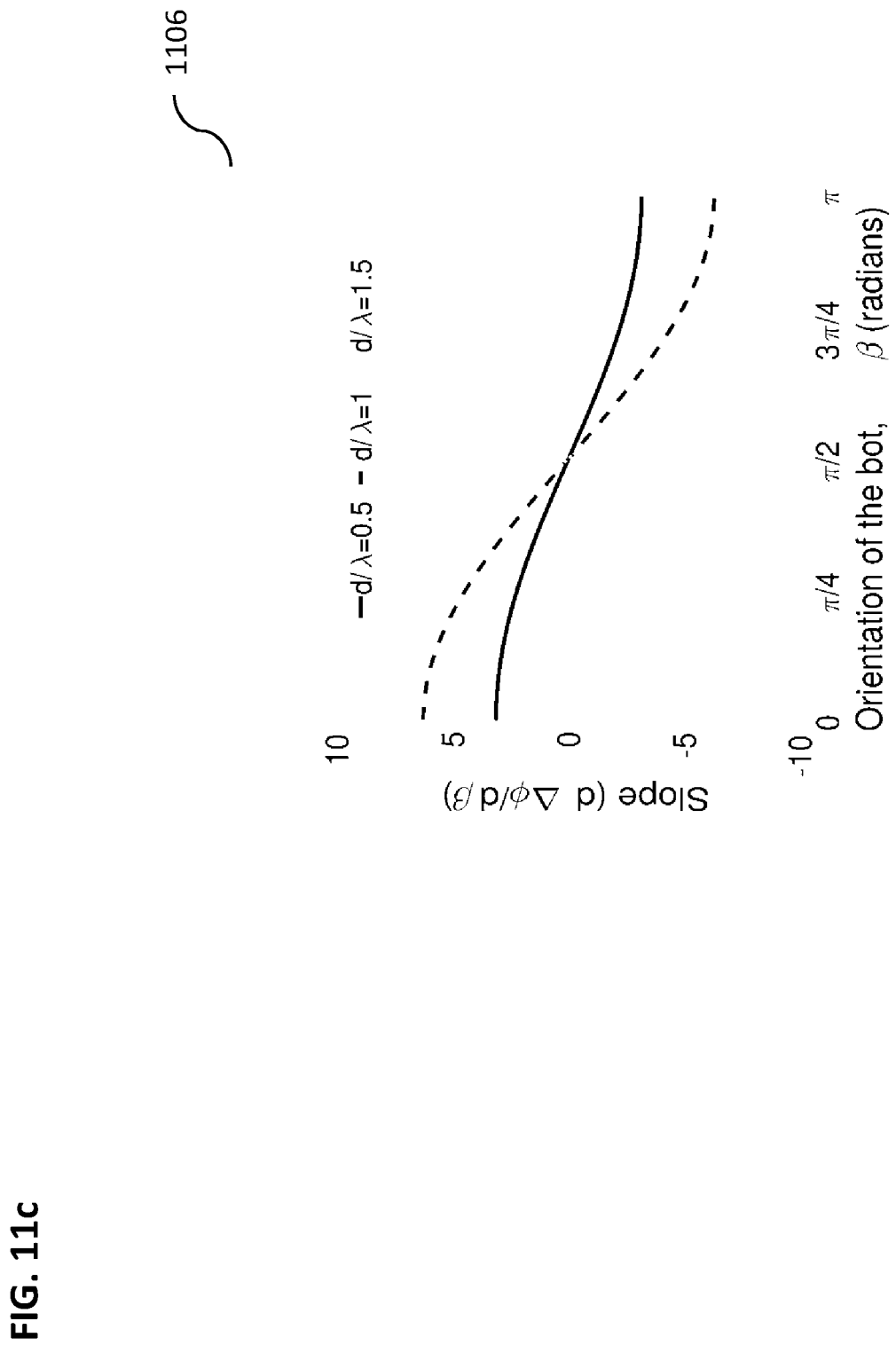

Extra distance travelled may be represented by d sin($\alpha_p^{AP}$). This extra distance travelled may induce the phase difference provided in Equation (7). Thus, the phase difference across two antennas may be used to estimate the antenna separation, d and deployment orientation Ψ. FIG. 11*b* illustrates exemplary plot 1104 of the phase difference $\Delta\phi_p$ for all the device 108's locations along the circular arc against the angle subtended by the device 108, $\beta_p$, for various antenna separations d. From plot 1104, for d≤λ/2, a unique mapping between the phase difference, $\Delta\phi_p$, and the device 108's location may be observed. However, for d>λ/2, ambiguous solutions result that prevent estimation of d and Ψ. The ambiguity occurs because the measured phase difference is a modulus of 2π, which means for a given $\Delta\phi_p$, the actual phase difference may be $2n_p\pi + \Delta\phi_p$, where $n_p$ is any positive integer. To resolve this issue, the current subject matter system may be configured to use, instead of the phase difference, a differential phase difference with respect to the device 108's angle at the AP ($\beta_p$) for optimally small increments of $\beta_p$, where the differential phase difference may have a unique one-to-one mapping 1106, as shown in FIG. 11*c*. Hence, for two close device 108's positions, a difference of the phase differences, $\Delta\phi_{p1} - \Delta\phi_{p2}$ may eliminate an ambiguity.

Figure 12:
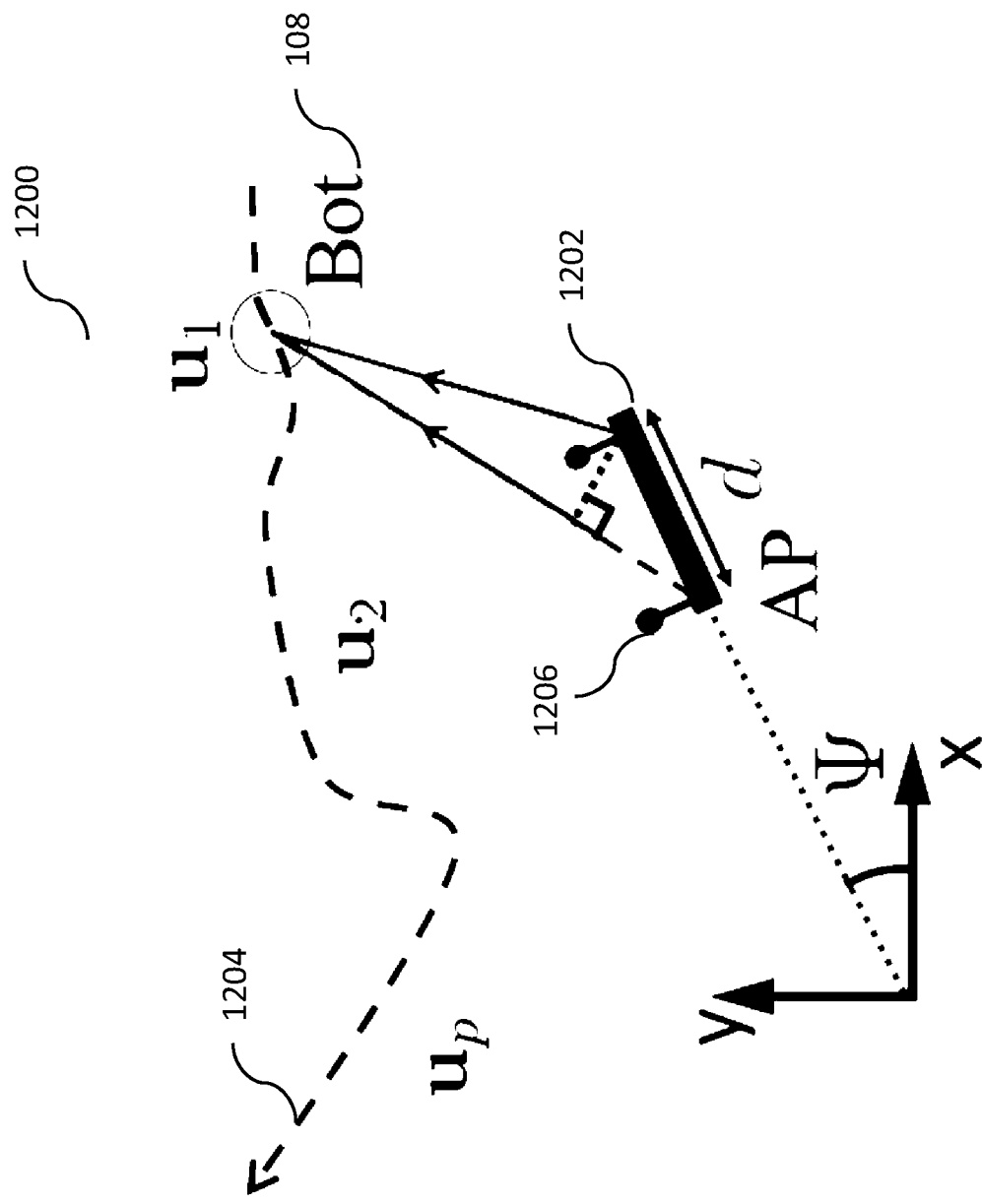
FIG. 12 illustrates an exemplary free flow movement of a wireless device, according to some implementations of the current subject matter.

In some implementations, the device 108 may be configured to move in a free flow trajectory, as shown in FIG. 12 (e.g., no restricted to circular motions). To determine relative antenna geometry, a distance between antennas, d, and deployment orientation of the antenna array, Ψ may be used. The device 108 may move to P distinct locations along a predetermined trajectory 1204 about the AP and collect a series of P CSI measurements, $H_p$ (p=1,2, ..., P), while simultaneously reporting the device 108's locations, $u_p$. The device 108 may make an angle $\beta_p$ with respect to the global X-axis. Next, for each position of the bot, $u_p$, the differential phase difference, $$\frac{d\Delta\phi}{d\beta}$$

between two antennas on the access point may be evaluated. Thus, using Equation (7), the differential phase difference may be determined to be $$\frac{d\Delta\phi}{d\beta} = -\frac{2\pi d}{\lambda}\cos(90° - (\beta - \Psi)) = -\frac{2\pi d}{\lambda}\sin(\beta - \Psi) \tag{9}$$

For incremental movements of the device 108, the differential phase difference in Equation (9) may be approximated as $$\frac{d\Delta\phi_p}{d\beta_p} \approx \frac{\Delta\phi_{p+1} - \Delta\phi_p}{\beta_{p+1} - \beta_p} \tag{10}$$

The device 108 may be configured to trace P (e.g., greater than 3) positions as it moves, which may enable obtaining the solution from an over-determined system of equations, consequently reducing the noise level. Thus, the current subject matter system may achieve highly accurate relative antenna position and orientation, and millimeter-level accuracy for relative antenna localization. Now to solve for (d, Ψ) uniquely as an over-determined system, it is easier to work with Cartesian co-ordinates than polar coordinates. Thus, the location of the first antenna of the AP may be fixed (e.g., antenna 1206 shown in FIG. 12) as $(x_1, y_1)$ and represent the second antenna (x, y) defined in the global coordinate system as:

$$(x,y) = (x_1 + d\cos(\Psi), y_1 + d\sin(\Psi)) \tag{11}$$

Equation (9) may be rewritten in terms of (x, y) as follows:

$$\frac{d\Delta\phi}{d\beta} = \frac{2\pi}{\lambda}[-(x-x_1)\sin(\beta_p) + (y-y_1)\cos(\beta_p)] \tag{12}$$

for p=1, 2, ..., P−1

Next, the P set of linear equations may be expressed in a matrix vector form as follows, $$A\begin{bmatrix} x - x_1 \\ y - y_1 \end{bmatrix} = b \tag{13}$$

where A is a (P−1)×2 matrix and b is a (P−1) sized column vector defined as $$A(p, :) = [-\sin(\beta_p) \cos(\beta_p)]$$

$$b(p) = \frac{\lambda}{2\pi}\frac{\Delta\phi_{p+1} - \Delta\phi_p}{\beta_{p+1} - \beta_p}, p = 1, 2, \ldots, P-1$$

Denoting $x = [x\ y]^T$ and $x_1 = [x_1\ y_1]^T$, x may be estimated as the following least squares problem:

$$\min_x \|A(x-x_1) - b\|^2 \tag{14}$$

From the above equation, Cartesian coordinates of the second antenna with respect to the first antenna may be determined. Generalizing the above equation (14), antenna separations may be determined as $d_i = \sqrt{(x_i-x_1)^2 + (y_i-y_1)^2}$ and the deployment orientation as $$\Psi_i = \frac{y_i - y_1}{x_i - x_1}$$

for all the antennas with respect to the first antenna, $x_1$. Hence, the system may accurately predict the location, antenna separation and deployment orientation of the access point.

In some implementations, to account for multipath issues (between the access point and the device 108), the current subject matter system may be configured to estimate the direction of direct path for AP localization (as described above) and recover direct path phases. In particular, the system may be configured to leverage multiple antennas on the device 108 along with the channel information across multiple subcarriers of the WiFi signal to identify the direct path and isolate it from other paths.

Figure 13:
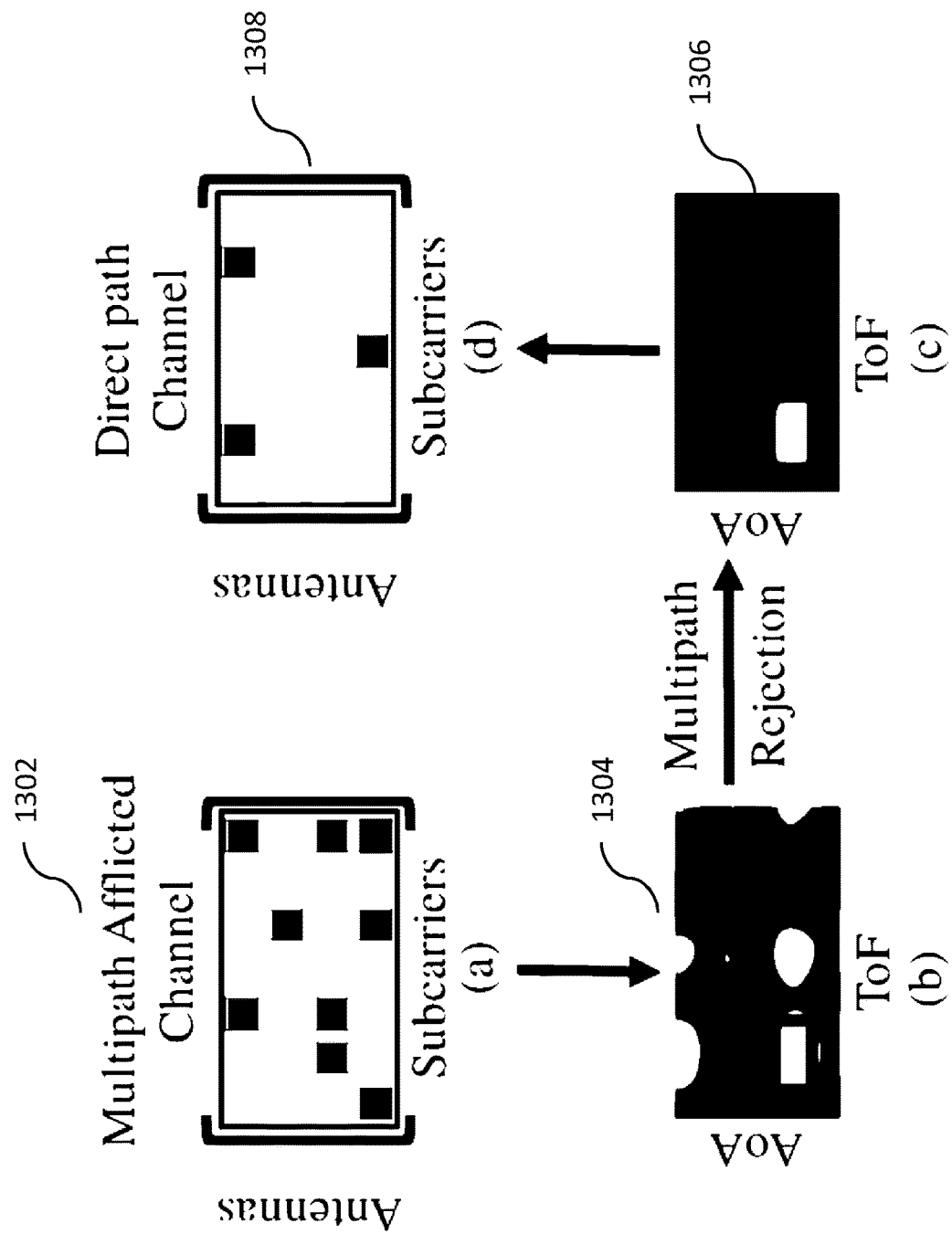
FIG. 13 illustrates an exemplary multipath estimation process, according to some implementations of the current subject matter.

Initially, $N_{bot} \times N_{sub}$ CSI-matrix (across $N_{bot}$ bot client's antennas and $N_{sub}$ subcarriers) as shown in FIG. 13, at 1302. A 2D-FFT transform may be applied to estimate the AoA and Time-of-Flight (ToF) for each arriving path to the device 108 (at 1304 in FIG. 13). Finally, the direct path AoA may be estimated by observing the signal, which has the least ToF. The direct path signal may travel the shortest distance and thus, has the lowest ToF. Hence, the direct path AoA estimates may be used to execute the AP localization algorithm, as discussed above. The direct path channel may be individually for each AP antenna and use them to recover the relative phase information. The $N_{bot} \times N_{sub}$ CSI-matrix for a fixed AP antenna may be used to estimate the AoA-ToF profile using the same procedure as described above with relation to 1302-1304 shown in FIG. 13. In some implementations, the direct path signal may be concentrated around the first ToF peak (in the AoA-ToF domain). Hence, a window function in the AoA-ToF domain may be applied to remove the adulteration due to multipath (at 1306 shown in FIG. 13) and use this information to extract the channel corresponding to direct path. Finally, to extract the direct path signal from this windowed AoA-ToF profile, 2D-IFFT may be executed on this windowed signal, as shown at 1308 in FIG. 13. The same process may be repeated for each AP antenna to finally obtain accurate AP antenna geometries, as discussed above.

In some implementations, a confidence metric (that may be used to discard low confidence measurements) may be determined by comparing a match of a current measurement with its surroundings. The comparisons may be executed using 3D point-clouds generated using an RGB-D camera. Point-clouds are to a 3D space what pixels are to a 2D image—each point carries an (x, y, z) coordinate and color information. Using registration accuracy of the point-clouds generated by consecutive pose measurements, the quality of the relative transformation may be estimated. Specifically, considering two consecutive measurement frames $F_i$ and $F_{i+1}$, the relative transformation $T_i$ between the two frames by looking at their pose estimates may be determined. Further, from the RGB-D images captured at these frames, point-clouds may be generated. By applying $T_i$ to the point-cloud from $F_i$, an estimate of $F_{i+1}$ may be determined and the two point-clouds may be "stitched" together. If $T_i$ is accurate, then a perfect overlap of the point-clouds over all the points visible in both frames may be observed. Based on this intuition, a covariance matrix $V_i$ may be used to accommodate all six degrees of freedom as found in a 3D environment, three belonging to each direction of translation and three for each axis of rotation, hence $V_i \in \mathbb{R}^{6 \times 6}$. The first two diagonal elements may provide the variance in the x and y position and $V_i[1, 2]$ may provide the co-variance between x and y. The variance in (x+y) may determining an amount of wiggle room for the pose in question. Hence, the larger the wiggle room, the less confidence there is in the poses. Further, by observing that these variances vary in orders of magnitude, and to linearize the confidence metric, the log of the variance may be calculated. The pseudo-confidence metric for $F_i$ may be determined as follows $$C_i = \log(\text{var}(x+y)) = \log(\text{var}(x) + \text{var}(y) - 2\,\text{cov}(x,y)) \quad (15)$$

Then, $C_i \, \forall i = 1, 2, \ldots, P$, between 0 and 1 to determine $w_i$, corresponding to confidences that may be used in Equation (6) above for filtering out the low confidence device 108 locations.

Figure 14:
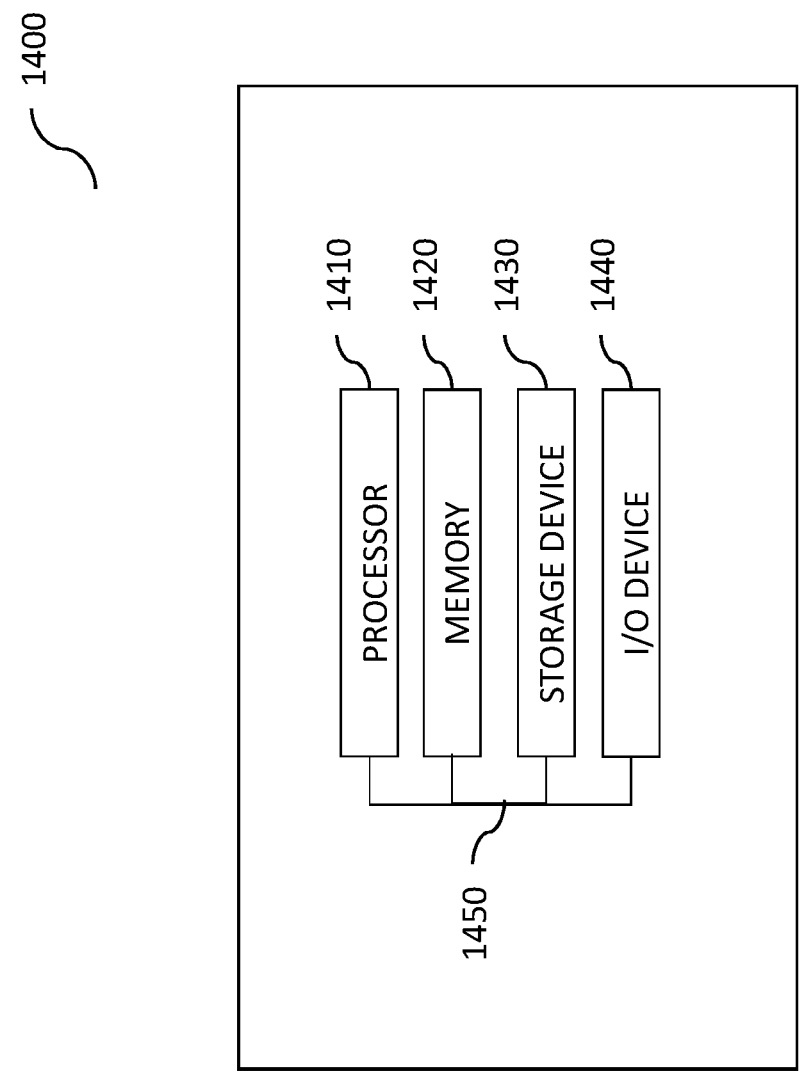
FIG. 14 illustrates an exemplary system, according to some implementations of the current subject matter.

In some implementations, the current subject matter can be configured to be implemented in a system 1400, as shown in FIG. 14. The system 1400 can include a processor 1410, a memory 1420, a storage device 1430, and an input/output device 1440. Each of the components 1410, 1420, 1430 and 1440 can be interconnected using a system bus 1450. The processor 1410 can be configured to process instructions for execution within the system 1400. In some implementations, the processor 1410 can be a single-threaded processor. In alternate implementations, the processor 1410 can be a multi-threaded processor. The processor 1410 can be further configured to process instructions stored in the memory 1420 or on the storage device 1430, including receiving or sending information through the input/output device 1440. The memory 1420 can store information within the system 1400. In some implementations, the memory 1420 can be a computer-readable medium. In alternate implementations, the memory 1420 can be a volatile memory unit. In yet some implementations, the memory 1420 can be a non-volatile memory unit. The storage device 1430 can be capable of providing mass storage for the system 1400. In some implementations, the storage device 1430 can be a computer-readable medium. In alternate implementations, the storage device 1430 can be a floppy disk device, a hard disk device, an optical disk device, a tape device, non-volatile solid state memory, or any other type of storage device. The input/output device 1440 can be configured to provide input/output operations for the system 1400. In some implementations, the input/output device 1440 can include a keyboard and/or pointing device. In alternate implementations, the input/output device 1440 can include a display unit for displaying graphical user interfaces.

Figure 15:
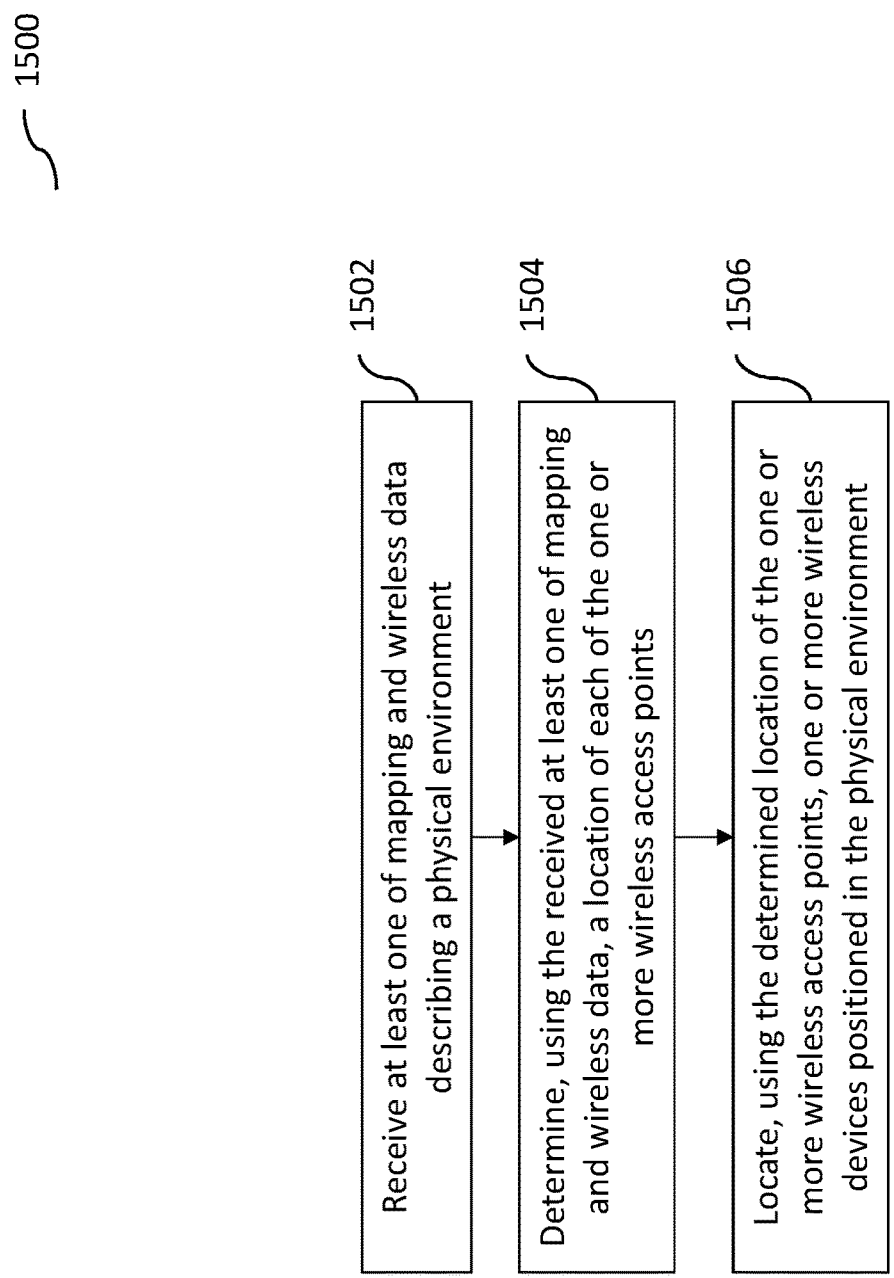
FIG. 15 illustrates an exemplary method, according to some implementations of the current subject matter.

FIG. 15 illustrates an exemplary method for determining a location of a device, according to some implementations of the current subject matter. The method may be executed by one or more devices shown in FIG. 1. At 1502, at least one of mapping and wireless data describing a physical environment may be received (e.g., by one or more devices 108, 110, and/or server 120 shown in FIG. 1). The physical environment (e.g., environment 102) may include one or more wireless access points (e.g., points 106). The mapping and/or wireless data may be received in accordance with the description in part II above.

At 1504, using the received mapping and/or wireless data, a location of each of the wireless access points may be determined. This location of the wireless access points may be determined using reverse localization, as described above in connection with part III.

At 1506, using the determined location of the wireless access points, one or more wireless devices (e.g. user devices, and/or any other devices) positioned in the physical environment may be located. The system 100 may be configured to use one or more deep learning techniques to determine location of a particular wireless device (e.g., device 110) in the environment 102, as shown in FIG. 1.

In some implementations, the current subject matter may include one or more of the following optional features. In some implementations, receiving may include autonomously determining mapping and/or wireless data describing the physical environment. Receiving may also include receiving the mapping and/or wireless data from a first device (e.g., a device 108 or a "bot"). The first device may include at least one of the following: a wireless receiver, a wireless transmitter, one or more processors, one or more servers, one or more motion components, one or more sensors, one or more cameras, one or more navigational sensors, one or more graphics processors, and any combination thereof.

In some implementations, the method may also include determining one or more location accuracy requirements for locating each of the wireless access points. The locating of the wireless devices may be executed using the determined location accuracy requirements.

In some implementations, the method may also include triangulating the wireless devices to determine location of the wireless devices. The triangulating may be executed using one or more errors associated with location of each of the wireless access points in the physical environment.

In some implementations, the determination of the location may include receiving wireless channel data associated with the one or more wireless access points.

In some implementations, the wireless access points may include at least one of the following: a wireless access device, a WiFi modem, a cellular base station, a wireless anchor device, a wireless transmitter, a wireless receiver, a cellular telephone, a smartphone, a tablet, a personal computer, and any combination thereof.

The determination may further include determining one or more angles of arrival of a wireless signal at the one or more wireless access points from a plurality of location points in the physical environment, and triangulating, based on the determined one or more angles of arrival, the location of each of the one or more wireless access points. Further, locating each of the wireless access points may include locating one or more of the antennas on each of the wireless access points. At least one wireless access point may be configured to be excluded from executing of the locating of the wireless devices (e.g., based on a confidence metric as described above).

In some implementations, the determination may also include determining a separation distances between one or more antennas of the one or more wireless access points. Further, it may also include determining an orientation of one or more antennas of the one or more wireless access points. In some implementations, the determination may further include simultaneously determining the separation distances and the orientation of the antennas. The simultaneously determination may include determining a relative location of the antennas on each of the wireless access points with respect to the determined wireless access point locations. Further, simultaneous determination may also include measuring a phase difference across an antenna of the access points and one or more antennas of the access points, whose separation distances and orientation were determined.

Moreover, the current subject matter may also estimate a direct path of a signal to the one or more wireless access points based on at least one of a direction of (e.g., an angle of arrival, angle of departure, etc.) of the signal and a time of flight of the signal to the one or more wireless access points. In some implementations, the direction of the signal having the least time of flight measured at a wireless receiver for each of the one or more antennas of the one or more of the wireless access points.

In some implementations, the receiving may include, using a wireless channel data associated with the one or more wireless access points, determining coordinates of the one or more wireless access points in the physical environment.

In some implementations, locating may include, using a neural network, generating a model of the physical environment, wherein one or more wireless signals generated by at least one of: the one or more wireless access points and the one or more wireless devices, and physical coordinates of the one wireless access points, being input to the neural network. The neural network may include an encoder component and one or more decoder components. In some implementations, the wireless signals may be represented as heat map images and configured to be processed by the encoder component. At least one of the decoder components may be configured to generate a corrected heat map image from the heat map images. At least another decoder component may be configured to generate an output location image of the one or more wireless devices.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer implemented method, comprising:
receiving at least one of mapping data or wireless channel data describing at least a physical environment, the physical environment including one or more wireless access points;
determining, using the received at least one of the mapping data or the wireless channel data, a location including coordinates of each of the one or more wireless access points in the physical environment, wherein the determining further includes determining one or more directions of a wireless signal at the one or more wireless access points from a plurality of location points in the physical environment, and triangulating, based on the determined one or more directions, the location of each of the one or more wireless access points; and
locating, using the determined location of the one or more wireless access points, one or more wireless devices positioned in the physical environment, wherein the locating of the one or more wireless access points comprises locating one or more antennas on each of the one or more wireless access points, wherein at least one wireless access point is configured to be excluded from executing of the locating of the one or more wireless devices.

2. The method according to claim 1, wherein the receiving comprises determining at least one of the mapping data or the wireless channel data describing the physical environment.

3. The method according to claim 2, wherein the receiving comprises receiving at least one of the mapping data or the wireless channel data from a first device, the first device comprising at least one of: a wireless receiver, a wireless transmitter, one or more processors, one or more servers, one or more motion components, one or more sensors, one or more cameras, one or more navigational sensors, one or more graphics processors, or any combination thereof;
wherein a travel path of the first device in the physical environment is optimized using at least one of the determined mapping data or the wireless channel data.

4. The method according to claim 2, wherein the determining of at least one of the mapping data or the wireless channel data is determined autonomously.

5. The method according to claim 1, further comprising determining one or more location accuracy requirements for locating each of the one or more wireless access points, wherein the locating of the one or more wireless devices is executed using the determined one or more location accuracy requirements.

6. The method according to claim 1, further comprising triangulating the one or more wireless devices to determine the location of the one or more wireless devices, wherein the triangulating is executed using one or more errors associated with location of each of the one or more wireless access points in the physical environment.

7. The method according to claim 1, further comprises receiving the wireless channel data associated with the one or more wireless access points.

8. The method according to claim 1, wherein the one or more wireless access points comprise at least one of: a wireless access device, a WiFi modem, a cellular base station, a wireless anchor device, a wireless transmitter, a wireless receiver, a cellular telephone, a smartphone, a tablet, a personal computer, or any combination thereof.

9. The method according to claim 1, wherein the determining includes at least one of: determining a separation distances between one or more antennas of the one or more wireless access points, determining an orientation of one or more antennas of the one or more wireless access points, or any combination thereof.

10. The method according to claim 1, wherein the determining comprises determining a separation distances between one or more antennas and an orientation of one or more antennas of one or more wireless access points, wherein the determining comprises determining a relative location of the one or more antennas on each of the one or more wireless access points with respect to the determined locations of the one or more wireless access points;
   wherein the determining comprises measuring a phase difference across an antenna of the one or more access points and one or more antennas of the one or more access points, whose separation distances and orientation are determined.

11. The method according to claim 10, wherein the determining comprises simultaneously determining the separation distances.

12. The method according to claim 1, wherein the determining comprises estimating a direct path of a signal to the one or more wireless access points based on at least one of a direction of the signal and a time of flight of the signal to the one or more wireless access points;
   wherein the direction of the signal having a least time of flight measured at a wireless receiver for each of one or more antennas of the one or more of the wireless access points.

13. The method according to claim 1, wherein the locating comprises, using a neural network to generate a model of the physical environment, wherein one or more wireless signals generated by at least one of: the one or more wireless access points and the one or more wireless devices, and physical coordinates of the one wireless access points, are input to the neural network.

14. The method according to claim 13, wherein
the neural network comprises an encoder component and one or more decoder components;
the one or more wireless signals are represented as heat map images and configured to be processed by the encoder component;
at least one of the one or more decoder components is configured to generate a corrected heat map image from the heat map images; and
at least another one of the one or more decoder components is configured to generate an output location image of the one or more wireless devices.

15. A system comprising:
at least one programmable processor; and
a non-transitory machine-readable medium storing instructions that, when executed by the at least one programmable processor, cause the at least one programmable processor to cause operations comprising:
   receiving at least one of mapping data or wireless channel data describing at least a physical environment, the physical environment including one or more wireless access points;
   determining, using the received at least one of the mapping data or the wireless channel data, a location including coordinates of each of the one or more wireless access points in the physical environment, wherein the determining further includes determining one or more directions of a wireless signal at the one or more wireless access points from a plurality of location points in the physical environment, and triangulating, based on the determined one or more directions, the location of each of the one or more wireless access points; and
   locating, using the determined location of the one or more wireless access points, one or more wireless devices positioned in the physical environment, wherein locating of the one or more wireless access points comprises locating one or more antennas on each of the one or more wireless access points, wherein at least one wireless access point is configured to be excluded from executing of the locating of the one or more wireless devices.

16. The system according to claim 15, wherein the receiving comprises determining at least one of the mapping data or the wireless channel data describing the physical environment.

17. The system according to claim 16, wherein the receiving comprises receiving at least one of the mapping data or the wireless channel data from a first device, the first device comprising at least one of: a wireless receiver, a wireless transmitter, one or more processors, one or more servers, one or more motion components, one or more sensors, one or more cameras, one or more navigational sensors, one or more graphics processors, or any combination thereof;
   wherein a travel path of the first device in the physical environment is optimized using at least one of the mapping data or the wireless channel data.

18. The system according to claim 16, wherein the determining of at least one of the mapping data or the wireless channel data is determined autonomously.

19. The system according to claim 15, further comprising determining one or more location accuracy requirements for locating each of the one or more wireless access points, wherein the locating of the one or more wireless devices is executed using the location accuracy requirements.

20. The system according to claim 15, wherein the operations further comprise
triangulating the one or more wireless devices to determine the location of the one or more wireless devices, wherein the triangulating is executed using one or more errors associated with location of each of the one or more wireless access points in the physical environment.

21. The system according to claim 15, wherein the operations further comprise receiving the wireless channel data associated with the one or more wireless access points.

22. The system according to claim 15, wherein the one or more wireless access points comprise at least one of: a wireless access device, a WiFi modem, a cellular base station, a wireless anchor device, a wireless transmitter, a wireless receiver, a cellular telephone, a smartphone, a tablet, a personal computer, or any combination thereof.

23. The system according to claim 15, wherein the determining comprises at least one of: determining a separation distances between one or more antennas of the one or more wireless access points, determining an orientation of one or more antennas of the one or more wireless access points, or any combination thereof.

24. The system according to claim 15, wherein the determining comprises determining a separation distances between one or more antennas and an orientation of one or more antennas of one or more wireless access points, wherein the determining comprises determining a relative location of the one or more antennas on each of the one or more wireless access points with respect to the determined locations of the one or more wireless access points;
   wherein the determining comprises measuring a phase difference across an antenna of the one or more access points and one or more antennas of the one or more access points, whose separation distances and orientation are determined.

25. The system according to claim 15, wherein the determining comprises estimating a direct path of a signal to the one or more wireless access points based on at least one of a direction of the signal and a time of flight of the signal to the one or more wireless access points;

wherein the direction of the signal having a least time of flight measured at a wireless receiver for each of one or more antennas of the one or more of the wireless access points.

26. The system according to claim 15, wherein the locating comprises, using a neural network to generate a model of the physical environment, wherein one or more wireless signals generated by at least one of: the one or more wireless access points and the one or more wireless devices, and physical coordinates of the one wireless access points, being are input to the neural network.

27. The system according to claim 26, wherein
the neural network comprises an encoder component and one or more decoder components;
the one or more wireless signals are represented as heat map images and configured to be processed by the encoder component;
at least one of the one or more decoder components is configured to generate a corrected heat map image from the heat map images; and
at least another one of the one or more decoder components is configured to generate an output location image of the one or more wireless devices.

28. A computer program product comprising a non-transitory machine-readable medium storing instructions that, when executed by at least one programmable processor, cause the at least one programmable processor to cause operations comprising:

receiving at least one of mapping data or wireless channel data describing at least a physical environment, the physical environment including one or more wireless access points;

determining, using the received at least one of the mapping data or the wireless channel data, a location including coordinates of each of the one or more wireless access points in the physical environment, wherein the determining further includes determining one or more directions of a wireless signal at the one or more wireless access points from a plurality of location points in the physical environment, and triangulating, based on the determined one or more directions, the location of each of the one or more wireless access points; and locating, using the determined location of the one or more wireless access points, one or more wireless devices positioned in the physical environment, wherein the locating of the one or more wireless access points comprises locating one or more antennas on each of the one or more wireless access points, wherein at least one wireless access point is configured to be excluded from executing of the locating of the one or more wireless devices.

* * * * *